United States Patent
Kobayashi et al.

(10) Patent No.: US 8,394,318 B2
(45) Date of Patent: Mar. 12, 2013

(54) COOLING APPARATUS OF STEEL SHEET, AND MANUFACTURING APPARATUS AND MANUFACTURING METHOD OF HOT-ROLLED STEEL SHEET

(75) Inventors: Kazuaki Kobayashi, Kashima (JP); Tomofumi Hosho, Kashima (JP); Yoichi Haraguchi, Sakura (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/300,895

(22) Filed: Nov. 21, 2011

(65) Prior Publication Data
US 2012/0104666 A1 May 3, 2012

Related U.S. Application Data

(63) Continuation of application No. PCT/JP2010/060772, filed on Jun. 24, 2010.

(30) Foreign Application Priority Data

Jun. 30, 2009 (JP) .................................. 2009-156024

(51) Int. Cl.
*C21D 1/667* (2006.01)
(52) U.S. Cl. ......................................... 266/46; 266/113
(58) Field of Classification Search .................... 266/44, 266/46, 103, 113
See application file for complete search history.

(56) References Cited

U.S. PATENT DOCUMENTS

| 2012/0068391 A1* | 3/2012 | Eto et al. ........................... 266/44 |
| 2012/0079863 A1* | 4/2012 | Hosho et al. ...................... 72/201 |
| 2012/0104666 A1* | 5/2012 | Kobayashi et al. ............... 266/44 |

FOREIGN PATENT DOCUMENTS

| JP | 58-086922 | 5/1983 |
| JP | 05-086298 | 4/1993 |
| JP | 3300594 | 4/2002 |
| JP | 3642031 | 2/2005 |
| JP | 4029871 | 10/2007 |

\* cited by examiner

*Primary Examiner* — Scott Kastler
(74) *Attorney, Agent, or Firm* — Clark & Brody

(57) ABSTRACT

A cooling apparatus of a steel sheet, which is excellent in discharging water without hindering the movement of a steel sheet, is disposed on a lower process side of a final stand in a row of hot finish rolling mills. The apparatus includes a plurality of cooling nozzles arranged to cool a steel sheet transported on transporting rolls, wherein the cooling nozzles are arranged on upper and lower surface sides of an area in which the steel sheet passes. A lower surface guide is arranged on the lower surface side with the lower surface guide comprising inlet holes through which cooling water sprayed from the cooling nozzles on the lower surface side passes and outlet holes through which the cooling water passes, dropping downwardly to be discharged. The inlet holes and the outlet holes are arranged alternately in a moving direction of the steel sheet.

17 Claims, 14 Drawing Sheets

Sheet width direction

Sheet passing direction

Distance h between steel sheet and lower surface guide (mm)

COOLING APPARATUS OF STEEL SHEET, AND MANUFACTURING APPARATUS AND MANUFACTURING METHOD OF HOT-ROLLED STEEL SHEET

TECHNICAL FIELD

The present invention relates to a cooling apparatus of a steel sheet, and a manufacturing apparatus and manufacturing method of a hot-rolled steel sheet. More particularly, it relates to a cooling apparatus of a steel sheet which is excellent in discharging cooling water, and a manufacturing apparatus and manufacturing method of a hot-rolled steel sheet.

BACKGROUND ART

A steel material used for automobiles, structural materials, and the like is required to be excellent in such mechanical properties as strength, workability, and toughness. In order to improve these properties comprehensively, it is effective to make a steel material with a fine-grained structure; to this end, a number of manufacturing methods to obtain a steel material with a fine-grained structure have been sought. Further, by making the fine-grained structure, it is possible to manufacture a high-strength hot-rolled steel sheet having excellent mechanical properties even if the amount of alloy elements added is reduced.

As a method for making a steel sheet with a fine-grained structure, it is known to carry out a large rolling reduction especially in the subsequent stage of hot finish rolling, deforming austenite grains greatly and increasing a dislocation density; and thereby to obtain fine-grained ferrite after cooling. Further, in view of facilitating the ferrite transformation by inhibiting recrystallization and recovery of the austenite grains, it is effective to cool a steel sheet to 600° C. to 700° C. as quickly as possible after rolling. In other words, subsequent to hot finish rolling, it is effective to rapidly cool a steel sheet after the rolling, by arranging a cooling apparatus capable of cooling more quickly than ever before. And in rapidly cooling a steel sheet after rolling in this way, it is recommended to have a large volume of cooling water sprayed over the steel sheet per unit area, and to have a high flow density in order to enhance a cooling capability.

However, if the volume of water and the flow density are increased in this way, the water accumulated (i.e. retained water) on an upper surface of a steel sheet increases due to a relation between water supply and water discharge. On the other hand, on a lower surface side of a steel sheet, the retained water between a lower surface guide and the steel sheet is likely to increase. This retained water is the water which has remained after being used for cooling the steel sheet. Thus it is desired to discharge the water as quickly as possible, and to provide the steel sheet with water supplied from a cooling nozzle, thereby ensuring a cooling capability. Further, since the retained water is a layer of water, if the layer is thick, the thickness sometimes hinders water from the cooling nozzles from reaching the steel sheet effectively. Furthermore, the retained water flows from a middle portion of the steel sheet toward both ends of the steel sheet in a width direction of the sheet; and the flow rate increases as the water approaches the end portions of the steel sheet. So, if the amount of retained water increases, cooling nonuniformity in the width direction of the steel sheet occurs to a large degree.

Here, looking at the lower surface side of the steel sheet, transporting rolls are arranged on the lower surface side, and a lower surface guide is formed between the transporting rolls to prevent a top portion of the steel sheet from entering therebetween. And this tends to cause the retained water between the lower surface guide and the lower surface of the steel sheet.

Several techniques for suppressing the amount of retained water on a lower surface side of a steel sheet, or for improving a water discharging ability have been disclosed.

For example, Patent Document 1 discloses a configuration in which a slit jet is arranged between transporting rolls, and a space is created over an entire region in a width direction of a cover which covers an entire lower surface of a steel sheet between the transporting rolls in a manner enabling water supply and water discharge by the slit jet.

Patent Document 2 discloses a configuration in which a header for supplying a columnar jet of water and a lower surface guide of a steel sheet are unified, and a cooling nozzle is arranged in the lower surface guide of the steel sheet.

Patent Document 3 discloses a configuration in which a full cone nozzle is used as a cooling means, and a narrow guide is arranged only in the middle of a hot-rolled steel sheet.

Patent Document 4 discloses a configuration in which narrow protection sheets are arranged as a lower surface guide with an appropriate spacing, or a sheet with holes which are combined to form a grid-like shape is used as a lower surface guide, so as to secure discharge of cooling water supplied by a columnar jet.

Patent Document 5 discloses a guide which facilitates discharge of water by arranging a hole to supply cooling water and a hole to discharge the water.

CITATION LIST

Patent Literature

Patent Document 1: Japanese Patent Application Laid-Open (JP-A) No. 58-086922
Patent Document 2: JP-A No. 05-086298
Patent Document 3: Japanese Patent (JP-B) No. 3300594
Patent Document 4: JP-B No. 3642031
Patent Document 5: JP-B No. 4029871

SUMMARY OF INVENTION

Problems to be Solved by the Invention

However, it is likely that the lower surface cover disclosed in Patent Document 1 causes a top portion of a steel sheet to get stuck in the space even if a space for supplying and discharging water is secured.

With the lower surface guide disclosed in Patent Document 2, there is a possibility that water discharge cannot be carried out in time due to increase in cooling water and a high flow density; thus improvement in a water discharging ability is required.

With the lower surface guide disclosed in Patent Document 3, even though a water discharging ability is highly ensured, a cooling capability of the guide area is likely to be degraded, causing cooling nonuniformity.

There is fear that the lower surface guide disclosed in Patent Document 4, causes a jet of water from a cooling nozzle to strike against a part of the guide, which then influences the force of the jet, and hinders a smooth jet, eventually influencing a cooling capability. Further, it is likely that the cooling capability is degraded because of the interference between water supply and water discharge.

Although a water discharging ability is improved with the lower surface guide disclosed in Patent Document 5, further improvement in the water discharging ability is required due to further increase in the flow density and absolute increase in the volume of water.

Accordingly, an object of the present invention is to provide, in a production line of a hot-rolled steel sheet: a cooling apparatus of a steel sheet which is excellent in discharging water without hindering a movement of a steel sheet (sheet passing); and a manufacturing apparatus and manufacturing method of a hot-rolled steel sheet.

Means for Solving the Problems

The present invention will be described below. Although the reference symbols in accompanying drawings are shown in parentheses for the purpose of easy understanding, the invention is not limited to an embodiment shown in the drawings.

A first aspect of the present invention is a cooling apparatus (20) of a steel sheet which is disposed on a lower process side of a final stand (11g) in a row (11) of hot finish rolling mills and which comprises a plurality of cooling nozzles (21c, 21c, ..., 22c, 22c, ...) arranged in a manner capable of cooling a steel sheet (1) being transported on transporting rolls (12, 12, ...), wherein the cooling nozzles are arranged on an upper surface side and a lower surface side of an area in which the steel sheet passes, so as to spray cooling water over the area; the cooling apparatus is provided with at least one of an upper surface guide (30) arranged on the upper surface side and a lower surface guide (40) arranged on the lower surface side; the upper surface guide and the lower surface guide respectively comprise: inlet holes (32, 32, ..., 42, 42, ...) through which the cooling water sprayed from the cooling nozzles passes; and outlet holes (33, 33, ..., 43, 43, ...) through which the cooling water passes to be discharged; only the inlet holes or the outlet holes are arranged in a width direction of the steel sheet, forming rows (32A, 32A, ..., 42A, 42A, ...) of inlet holes and rows (33A, 33A, ..., 43A, 43A, ...) of outlet holes, respectively; the row of outlet holes is arranged between the rows of inlet holes in a transporting direction of the steel sheet; and the row of outlet holes is provided with devices (33a, 33a, ..., 43s, 43s, ...) for preventing entering of a steel sheet, which are members to prevent the steel sheet from entering the row of outlet holes.

Here, "cooling water" refers to cooling water as a cooling medium, and is not required to be so-called purified water. The cooling water may contain incidental impurities, like industrial water and the like.

A second aspect of the present invention is the cooling apparatus (20) of a steel sheet according to the first aspect, wherein each one of the cooling nozzles (22, 22, ...) is provided with each one of the inlet holes (42, 42, ...).

A third aspect of the present invention is the cooling apparatus (20) of a steel sheet according to the first or second aspect, wherein the lower surface guide (40) comprises members (45, 45, ...) forming a water supplying and discharging passage, which form a water passage leading to the inlet holes (42, 42, ...) and a water passage leading from the outlet holes (43, 43, ...); and cooling water from the cooling nozzles (22c, 22c, ...) is sprayed into the water passage leading to the inlet holes.

A fourth aspect of the invention is the cooling apparatus (20) of a steel sheet according to the third aspect, wherein a cross section of a flow path in a lower portion of the passage which leads from the outlet holes (43, 43, ...) of the lower surface guide is formed more widely than a cross-sectional area of a flow path in an upper portion of the passage.

A fifth aspect of the present invention is the cooling apparatus (20) of a steel sheet according to any one of the first to fourth aspects, wherein a shape of an opening of the inlet holes (42, 42, ...) is substantially similar to a cross-sectional shape of a jet of cooling water sprayed from the cooling nozzles (22c, 22c, ...).

Here, "substantially similar" does not mean to require a similar shape in a strict sense but to mean that the shape of the opening of the inlet hole is formed so as to correspond to the cross-sectional shape of the jet of the cooling water.

A sixth aspect of the present invention is the cooling apparatus (20) of a steel sheet according to any one of the first to fifth aspects, wherein the cooling nozzles (22c, 22c, ...) are flat spray nozzles.

A seventh aspect of the present invention is the cooling apparatus (20) of a steel sheet according to any one of the first to sixth aspects, wherein, among the inlet holes (42, 42, ...) and the outlet holes (43, 43, ...) of the lower surface guide (40), at least one end of the lower surface guide in a transporting direction of the steel sheet has the outlet holes.

An eighth aspect of the present invention is the cooling apparatus (20) of a steel sheet according to any one of the first to sixth aspects, wherein, among the inlet holes (42, 42, ...) and the outlet holes (43, 43, ...) of the lower surface guide (40), both ends of the lower surface guide in a transporting direction of the steel sheet have the outlet holes.

A ninth aspect of the invention is the cooling apparatus (20) of a steel sheet according to any one of the first to eighth aspects, wherein the outlet holes (33, 33, ...) of the upper surface guide (30) are provided with backflow preventing members (33p, 33p, ...) standing from edges of the outlet holes.

A tenth aspect of the invention is the cooling apparatus (20) of a steel sheet according to any one of the first to ninth aspects, wherein the upper surface guide (30) comprises, on an upper side of the outlet holes (33, 33, ...), portions (35, 35, ...) forming a water discharging passage which are surrounded with members to form a passage for water discharge; and rectifying members (36, 36, ...), which are in a protruding shape, are disposed on a part of the portion forming a water discharging passage, the part being opposite to the outlet holes (33, 33, ...).

An eleventh aspect of the invention is a manufacturing apparatus (10) of a hot-rolled steel sheet comprising: a final stand (11g) in a row (11) of hot finish rolling mills; and the cooling apparatus (20) of a steel sheet according to any one of the first to tenth aspects, in the mentioned order in the transporting direction of the steel sheet.

A twelfth aspect of the invention is a manufacturing apparatus (10) of a hot-rolled steel sheet comprising: a final stand (11g) in a row (11) of hot finish rolling mills; the cooling apparatus (20) of a steel sheet according to anyone of the first to tenth aspects; and a water removing device (13) which removes the cooling water, in the mentioned order in the transporting direction of the steel sheet.

A thirteenth aspect of the invention is the manufacturing apparatus (10) of a hot-rolled steel sheet according to the eleventh or twelfth aspect, wherein, among the cooling nozzles (21c, 21c, ..., 22c, 22c, ...) provided to the cooling apparatus (20), the cooling nozzle arranged on the most upper process side is disposed inside a housing (11gh) of the final stand (11g).

Here, "inside a housing" refers to a position which is on an upper process side of an outer surface of the housing, (an outer surface on a lower process side in the transporting direction of the steel sheet).

A fourteenth aspect of the invention is the manufacturing apparatus (10) of a hot-rolled steel sheet according to any one of the eleventh to thirteenth aspects, wherein, among the cooling nozzles (21c, 21c, ..., 22c, 22c, ...) provided to the cooling apparatus (20), at least a cooling water ejection outlet of the cooling nozzle closest to the final stand (11g) is directed toward a steel sheet to be positioned at an exit of work rolls in the final stand.

A fifteenth aspect of the invention is the manufacturing apparatus (10) of a hot-rolled steel sheet according to any one of the eleventh to fourteenth aspects, comprising equipment which is disposed in a manner contacting with the steel sheet (1) or in a manner close to the steel sheet, and which is arranged to be orthogonal to the transporting direction of the steel sheet, wherein among the inlet holes (42, 42, ...) and the outlet holes (43, 43, ...) of the lower surface guide (40), the outlet holes are arranged most closely to the equipment.

A sixteenth aspect of the invention is the manufacturing apparatus (10) of a hot-rolled steel sheet according to the fifteenth aspect, wherein the equipment is the work roll (11gw) in the final stand.

A seventeenth aspect of the invention is a manufacturing method of a hot-rolled steel sheet comprising a step to treat a steel sheet rolled in the final stand (11g) by using the manufacturing apparatus (10) of a hot-rolled steel sheet according to any one of the eleventh to sixteenth aspects.

Effects of the Invention

With the present invention, it is possible to provide, in a production line of a hot-rolled steel sheet: a cooling apparatus capable of guiding a passing steel sheet and of appropriately discharging water even when a high flow density and a large volume of cooling water is supplied; and to provide a manufacturing apparatus and manufacturing method of a hot-rolled steel sheet. By these, rapid cooling after rolling can be further facilitated, as described above, thereby enabling manufacturing of a steel sheet with an excellent mechanical performance.

| | Description of the Symbols |
|---|---|
| 1 | steel sheet |
| 10 | manufacturing apparatus |
| 11 | row of rolling mills |
| 11g | final stand |
| 12 | transporting roll |
| 13 | pinch roll |
| 20 | cooling apparatus |
| 21 | upper surface water supplying device |
| 21a | cooling header |
| 21b | conduit |
| 21c | cooling nozzle |
| 22 | lower surface water supplying device |
| 22a | cooling header |
| 22b | conduit |
| 22c | cooling nozzle |
| 30 | upper surface guide |
| 31 | guide sheet |
| 32 | inlet hole |
| 32A | row of inlet holes |
| 33 | outlet hole |
| 33A | row of outlet holes |
| 33p | backflow preventing member |
| 35 | portion forming water discharging passage |
| 36 | rectifying member |
| 40 | lower surface guide |
| 41 | guide sheet |
| 42 | inlet hole |
| 42A | row of inlet holes |
| 43 | outlet hole |
| 43A | row of outlet holes |
| 45 | member forming water supplying and discharging passage |
| 45a | sheet-shaped member |
| 45b | sheet-shaped member |

MODES FOR CARRYING OUT THE INVENTION

The functions and benefits of the present invention described above will be apparent from the following modes for carrying out the invention. The present invention will be described based on the embodiments shown in the accompanying drawings. However, the invention is not limited to these embodiments.

Figure 1:
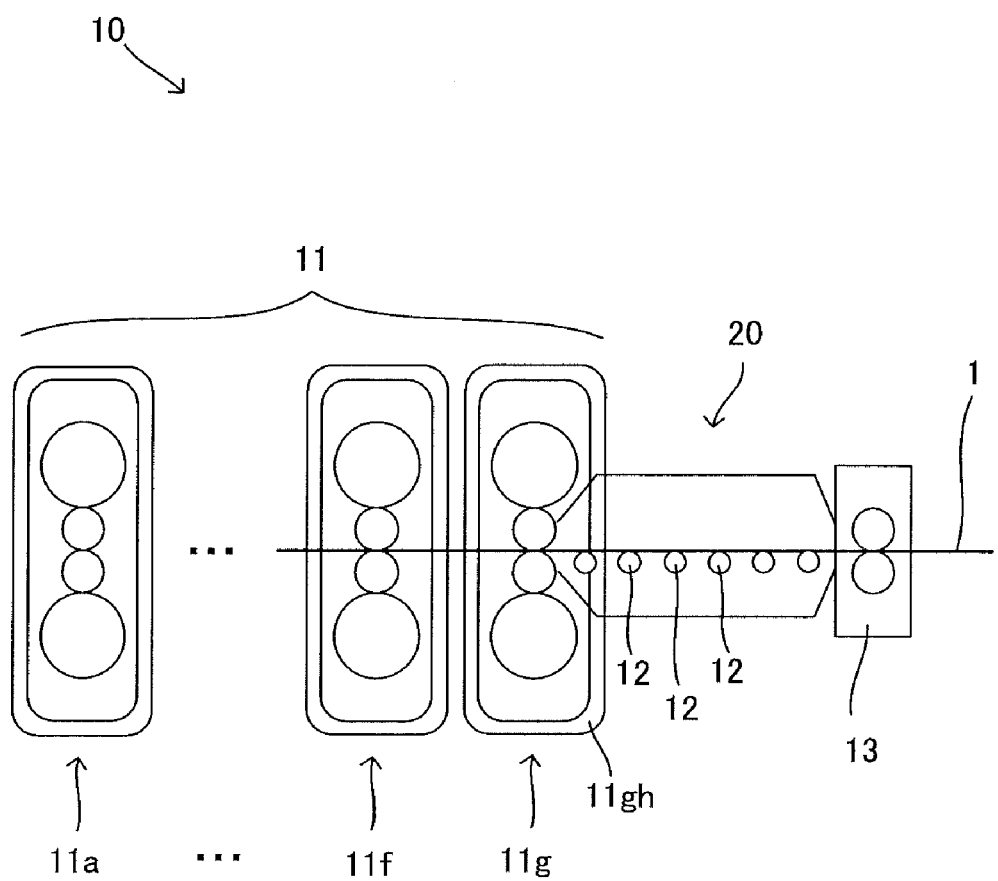
FIG. 1 is a schematic view showing a part of a manufacturing apparatus of a hot-rolled steel sheet according to one embodiment.

FIG. 1 is a schematic view of a cooling apparatus (20) of a steel sheet and a part of a manufacturing apparatus (10) of a hot-rolled steel sheet which comprises the cooling apparatus (20). In FIG. 1, a steel sheet 1 is transported from a left on the sheet of paper (upstream side, upper process side) to a right (downstream side, lower process side), a direction from a top to a bottom on the sheet of paper being a vertical direction. A direction from the upstream side (the upper process side) to the downstream side (the lower process side) may be referred to as a sheet passing direction. Further, a direction of a width of the passing steel sheet, which is orthogonal to the sheet passing direction may be referred to as a width direction of a steel sheet. Hereinafter, reference symbols may be omitted in the below descriptions of the drawings for the purpose of easy viewing.

As shown in FIG. 1, the manufacturing apparatus 10 of a hot-rolled steel sheet comprises: a row 11 of hot finish rolling mills; a cooling apparatus 20; and transporting rolls 12, 12, ...; and a pinch roll 13. Further, a heating furnace, a row of rough rolling mills, and the like, the figures and descriptions of which are omitted, are arranged on the upstream side of the row 11 of hot finish rolling mills. And these set better conditions for a steel sheet to go through the row 11 of hot finish rolling mills. On the other hand, another cooling apparatus or various kinds of equipment such as a coiler to ship the steel sheet as a steel sheet coil, are arranged on the downstream side of the pinch roll 13.

A hot-rolled steel sheet is generally manufactured in the following way. A rough bar which has been taken from a heating furnace and has been rolled by a rough rolling mill to have a predetermined thickness is rolled continuously by the row 11 of hot finish rolling mills to have a predetermined thickness, while controlling a temperature. After that, the steel sheet is rapidly cooled in the cooling apparatus 20. Here, the cooling apparatus 20 is disposed from inside the housing 11gh which supports rolls, in the final stand 11g of the row 11 of hot finish rolling mills. More specifically, the cooling apparatus is disposed in a manner as closely to the rolls as possible. Then, the steel sheet passes through the pinch roll 13, and is cooled by another cooling apparatus to a predetermined coiling temperature to be coiled by a coiler.

The manufacturing apparatus 10 of a steel sheet (, which may simply be referred to as a "manufacturing apparatus 10") comprises a row 11 of hot finish rolling mills as described above. In the embodiment, seven rolling mills (11a, 11b, 11c, ..., 11g) are aligned along the sheet passing direction. Each of the rolling mills 11a, 11b, ..., 11g forms each stand; and a rolling reduction and the like are set in each of the rolling mills to allow the steel sheet to meet conditions for thickness, mechanical properties, surface quality, and the like which are required as a final product.

Figure 2A:
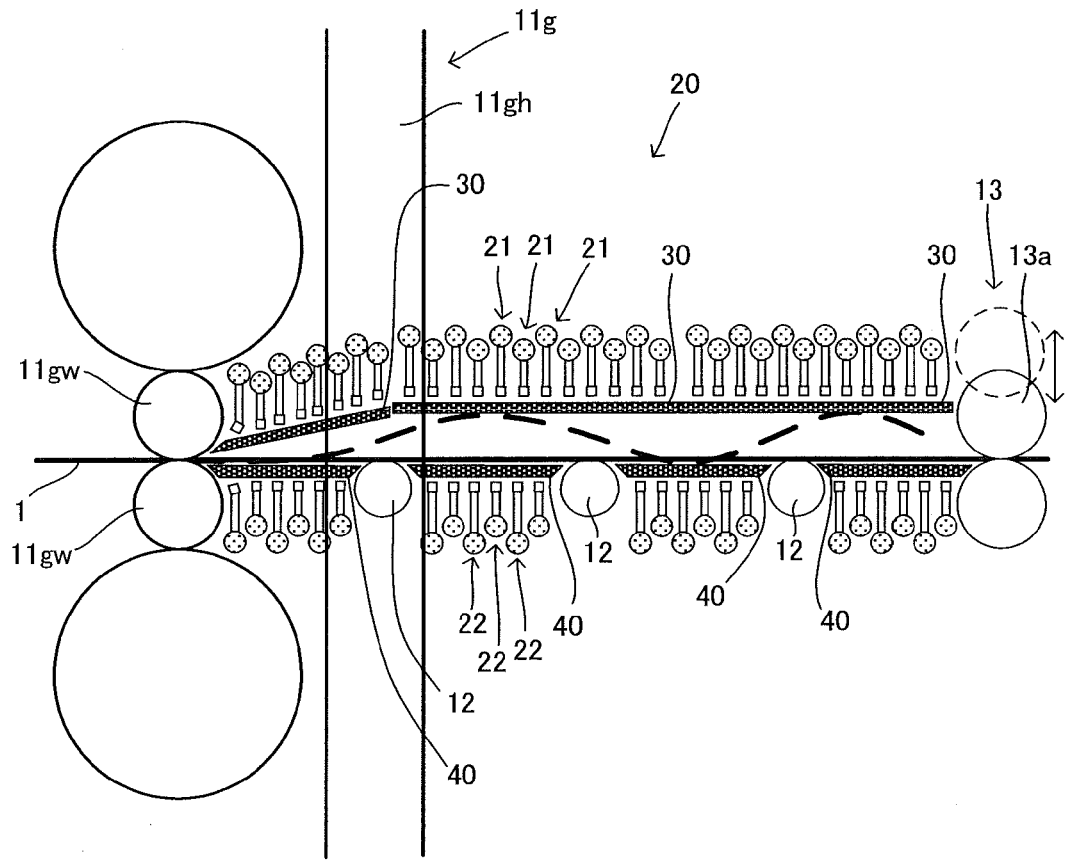
FIG. 2 is an enlarged view focusing on an area of FIG. 1, in which a cooling apparatus is disposed.
Figure 2B:
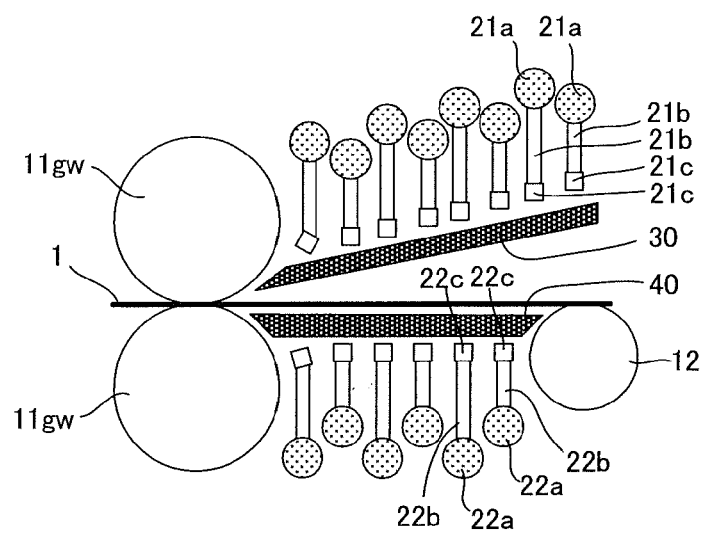

Next, the cooling apparatus 20 will be described. FIG. 2 is an enlarged view of an area in FIG. 1, in which the cooling apparatus is provided. FIG. 2A is an enlarged view showing the cooling apparatus 20 in its entirety, whereas FIG. 2B is a view further focusing on the vicinity of the final stand 11g. The cooling apparatus 20 comprises: upper surface water supplying devices 21, 21, ... ; lower surface water supplying devices 22, 22, ... ; upper surface guides 30, 30, ... ; and lower surface guides 40, 40, ....

The upper surface water supplying devices 21, 21, ... are devices to supply cooling water to an upper surface side of the steel sheet 1. The upper surface water supplying devices 21, 21, ... comprise: cooling headers 21a, 21a, ... ; conduits 21b, 21b, ..., provided to each of the cooling headers 21a, 21a, ..., in a form of a plurality of rows; and cooling nozzles 21c, 21c, ... attached to an end portion of the conduits 21b, 21b, ....

In the embodiment, the cooling header 21a is a pipe extending in a direction orthogonal to the sheet passing direction, in other words, in a direction from a back part to a front part on the sheet of FIG. 2; and these cooling headers 21a, 21a are aligned in the sheet passing direction.

The conduit 21b is a thin pipe diverging from each cooling header 21a in a plural form, and an opening end of the conduit is directed toward the upper surface side of the steel sheet. A plurality of the conduits 21b, 21b, ... are arranged in a comb-like manner along a direction of a tube length of the cooling header 21a, namely, in the width direction of the steel sheet.

Figure 3:
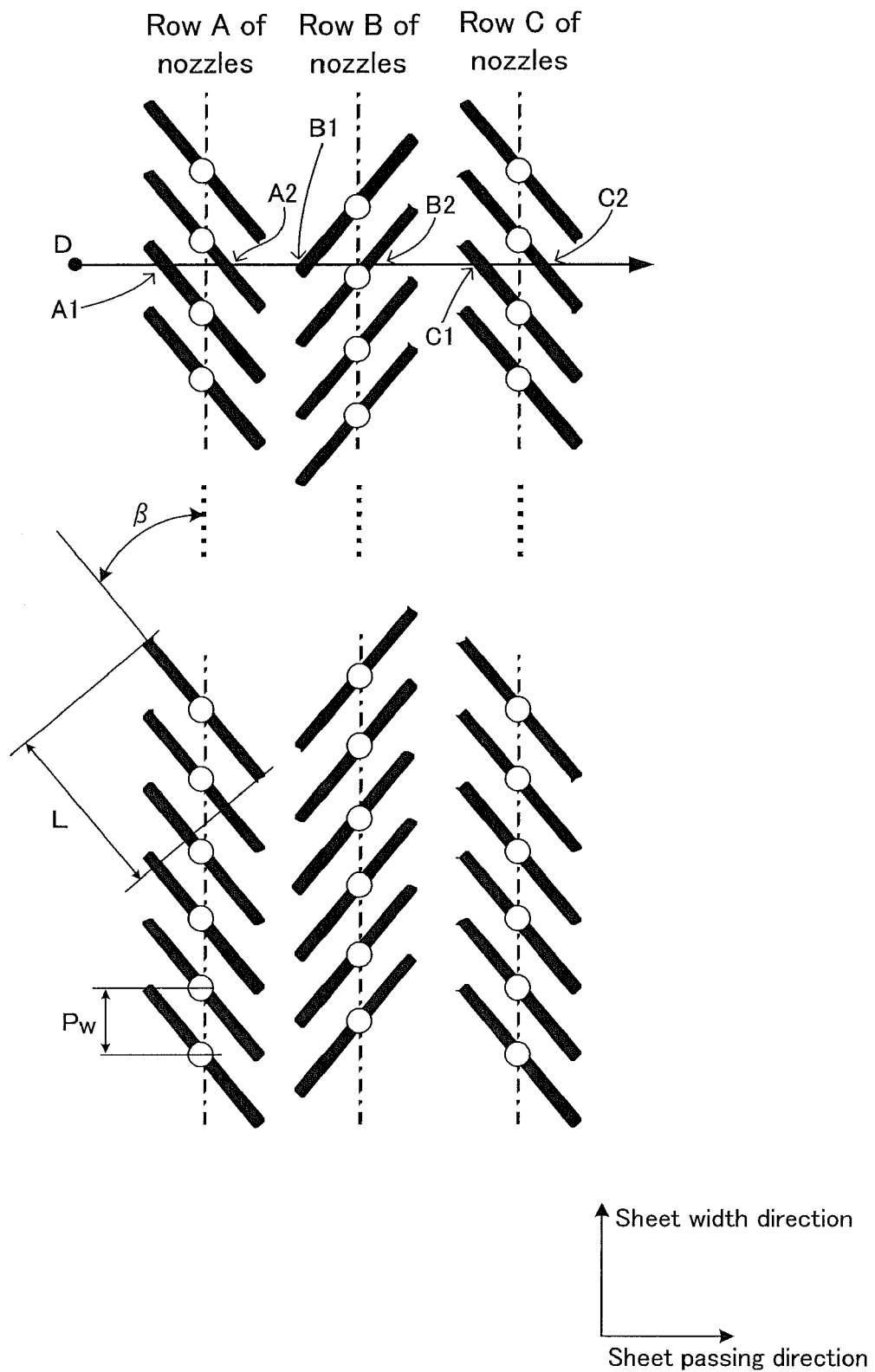
FIG. 3 is a view illustrating an arrangement of cooling nozzles and a manner of ejection by the cooling nozzles according to the embodiment.

An end portion of each of the conduits 21b, 21b, ... is provided with each of the cooling nozzles 21c, 21c, .... The cooling nozzles 21c, 21c, ..., according to the embodiment are flat spray nozzles capable of forming a fan-like jet of cooling water (for example, a thickness of approximately 5 mm to 30 mm). FIG. 3 schematically shows a manner of an impact by the jets of cooling water formed on a surface of the steel sheet 1. In FIG. 3, a open circle shows a position right below the cooling nozzles 21c, 21c, .... Further, a thick line schematically shows an impact position and shape of the jets of cooling water. FIG. 3 shows both the sheet passing direction and the width direction of the steel sheet.

As can be seen from FIG. 3, in the embodiment, the rows of nozzles next to each other are arranged in a manner that the position of one of the rows in the width direction of the steel sheet differs from the position of its adjacent row. Further, the rows of nozzles are arranged in a so-called zigzag manner so that the position of one of the rows is the same as the position of the row which is located further next. With this configuration, a region of an impact by the jets of water, in the width direction of the transported steel sheet is uniformed each time the steel sheet passes through a row of nozzles, thereby enabling decrease in cooling nonuniformity in the width direction of the steel sheet.

In the embodiment, the cooling nozzles 21c, 21c, ... are arranged so that an entire position on the surface of the steel sheet in the width direction of the steel sheet can pass through jets of cooling water at least twice. That is, a point D on which the passing steel sheet 1 is located moves along a linear arrow in FIG. 3. At this time, in such a manner as twice in a row A of nozzles (A1, A2); twice in a row B of nozzles (B1, B2); and twice in a row C of nozzles (C1, C2), in each of the rows of the nozzles, the jets of water from the cooling nozzles belonging to the row of nozzles strike twice. As such, the cooling nozzles 21c, 21c, ... are arranged in a manner that the following relation is satisfied among a distance Pw between the cooling nozzles 21, 21, ... ; an impact width L of jets of cooling water; and a twisting angle $\beta$.

$$L = 2Pw/\cos \beta$$

Herein, the number of times at which the steel sheet passes through jets of cooling water is set to be twice, to which the number of times is not limited; it may be three or more times.

For the purpose of uniforming a cooling capability in the width direction of the steel sheet, in the rows of nozzles adjacent to each other in the sheet passing direction, the cooling nozzles in one of the rows are twisted in an opposite direction from the nozzles in its adjacent row.

Here, in the embodiment, in the rows of nozzles adjacent to each other as above, the nozzles in one of the rows are configured to be twisted in the opposite direction from the nozzles in its adjacent row. However, a configuration is not necessarily limited to this; all of the cooling nozzles may be twisted in the same direction. Further, a twisting angle ($\beta$ as above) is not particularly limited to this, but may be adequately determined in view of a required cooling capability and an arrangement of equipment.

Furthermore, in the embodiment, in view of the above benefits, the rows of nozzles adjacent to one another in the passing direction of the steel sheet are arranged in a zigzag manner. However, a configuration is not limited to this; and the cooling nozzles may be configured to be aligned in a linear manner in the sheet passing direction.

A position at which the upper surface water supplying device 21 is provided, in specific, a position at which the cooling nozzles 21c, 21c, ... are disposed is not particularly limited; however, the upper surface water supplying device, or the cooling nozzles are preferably disposed right after the final stand 11g in the row 11 of hot finish rolling mills, from inside the housing 11gh of the final stand 11g, in a manner as closely to the work roll 11gw in the final stand 11g as possible. This arrangement enables rapid cooling of the steel sheet 1 immediately after it has been rolled by the row 11 of hot finish rolling mills. It is also possible to stably guide the top portion of the steel sheet 1 into the cooling apparatus 20. In the embodiment, as seen from FIG. 2, the cooling nozzle 21c which is close to the work roll 11gw is arranged closely to the steel sheet 1.

Further, a direction in which the cooling water is sprayed from the cooling water ejection outlet of each of the cooling nozzles 21c, 21c, . . . is basically a vertical direction; however, the ejection of the cooling water from the cooling nozzle which is closest to the work roll 11gw in the final stand 11g is preferably directed more toward the work roll 11gw than vertically. This configuration can further shorten the time period from reduction of the steel sheet 1 in the final stand 11g to initiation of cooling the steel sheet. And the recovery time of rolling strains accumulated by rolling can also be reduced to almost zero. Therefore, a fine-grained steel sheet can be manufactured.

The lower surface water supplying devices 22, 22, . . . are devices to supply cooling water to the lower surface side of the steel sheet 1. The lower surface water supplying devices 22, 22, . . . comprise: cooling headers 22a, 22a, . . . ; conduits 22b, 22b, . . . , provided to each of the cooling headers 22a, 22a, . . . , in a form of a plurality of rows; and cooling nozzles 22c, 22c, . . . attached to an end portion of the conduits 22b, 22b, . . . . The lower surface water supplying devices 22, 22, . . . are arranged opposite to the above described upper surface water supplying devices 21, 21 . . . ; thus, a direction of a jet of cooling water by the lower surface water supplying device differs from that by the upper surface water supplying device. However, the lower surface water supplying device is generally the same in structure as the upper surface water supplying device; so the descriptions of the lower surface water supplying device will be omitted.

Figure 4A:
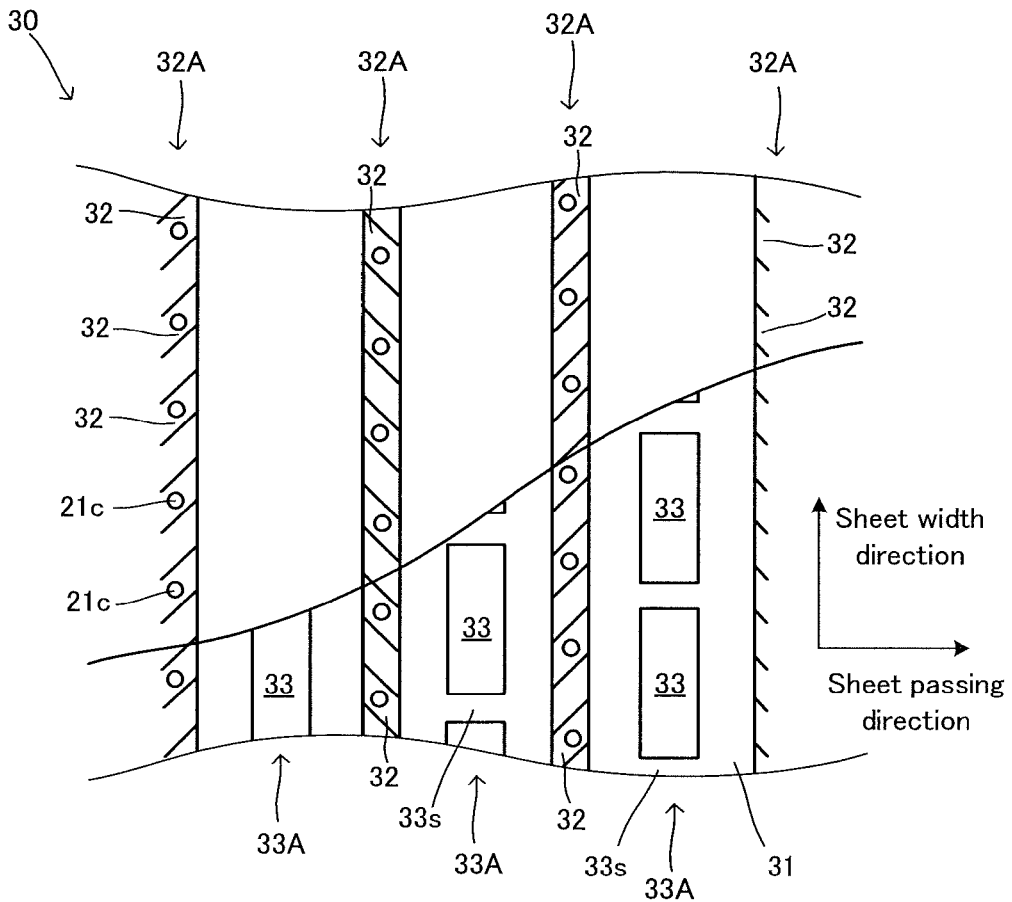
FIG. 4 is a view illustrating an upper surface guide.
Figure 4B:
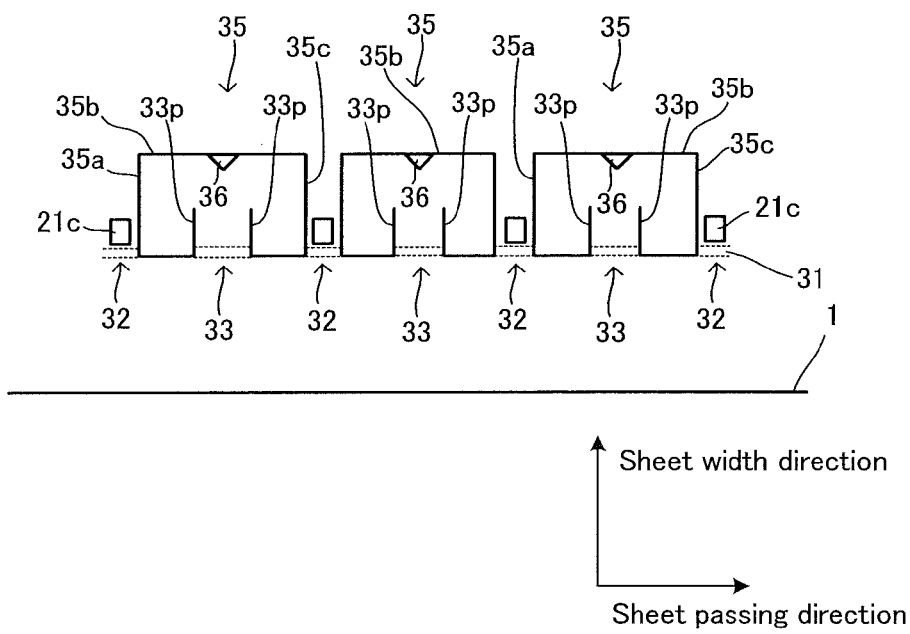

Next, an upper surface guide 30 will be described. The upper surface guide 30 is schematically shown in FIG. 4. FIG. 4A is a partially cutout view seen from the top of the cooling apparatus 20. FIG. 4B is a view seen from the side surface of the cooling apparatus. FIG. 4 also shows a position of the cooling nozzles 21c, 21c, . . . and a position of the steel sheet 1.

The upper surface guide 30 comprises: a guide sheet 31, which is in a sheet shape; and portions 35, 35, . . . forming a water discharging passage, which are disposed on an upper surface side of the guide sheet 31.

The guide sheet 31 is a sheet-shaped member, and is provided with inlet holes 32, 32, . . . , and outlet holes 33, 33, . . . .

The inlet holes 32, 32, . . . are arranged at a position corresponding to the above described cooling nozzles 21c, 21c, . . . and the shape of the inlet holes also corresponds to a shape of a jet of water. Thus, the inlet holes 32, 32, . . . are aligned in the width direction of the steel sheet to form a row 32A of inlet holes. The rows of inlet holes 32A, 32A, . . . are also aligned in the sheet passing direction. Here, the shape of the inlet hole is not particularly limited as long as the inlet hole is shaped in a manner that jets of water from the cooling nozzles 21c, 21c, . . . strike against the guide sheet as little as possible. Specifically, though it depends on the characteristics of a jet of water from the cooling nozzle to be used, the inlet hole is preferably in a shape which allows cooling water to pass without having 10% or more of a total volume of the cooling water ejected from one cooling nozzle 21c per time unit strike against the guide sheet 31 of the upper surface guide 30. Further, to efficiently provide the inlet holes 32, 32, . . . in a limited space, it is preferable that the shape of the opening of the inlet hole be substantially similar to a cross-sectional shape of a jet of cooing water (a cross section orthogonal to a direction of an ejection axis).

On the other hand, the outlet holes 33, 33, . . . are rectangular holes; and a plurality of the outlet holes are aligned in the width direction of the steel sheet to form a row 33A of outlet holes. By having a part of the guide sheet 31 remain between the outlet holes 33, 33, . . . , a top portion of the transported steel sheet is prevented from entering the outlet holes 33, 33, . . . . Namely, this becomes a device 33s, 33s, . . . for preventing entering of a steel sheet. The rows 33A, 33A, . . . of outlet holes are disposed between the above described rows 32A, 32A, . . . of inlet holes.

In other words, the row 32A of inlet holes and the row 33A of outlet holes are disposed alternately on the guide sheet 31 along the sheet passing direction.

Herein, as a preferable shape of the opening of the outlet holes 33, 33, . . . , the rectangular shape of the opening aligned as above has been described. This configuration makes it possible to efficiently obtain a large area of an opening in a limited space; however, the shape is not limited to this as long as it can secure an adequate amount of discharged water and can prevent a steel sheet from getting stuck. That is, the shape of the opening of the outlet hole is not limited to a rectangular shape described above; it may be a circular and trapezoidal shape. And a shape of the device for preventing entering of a steel sheet corresponds to the shape of the opening. For example, when the outlet hole is in a trapezoidal shape having a top base and a bottom base in the sheet passing direction, the device for preventing entering of a steel sheet may be in a parallelogram shape leaning away from the sheet passing direction.

Figure 5:
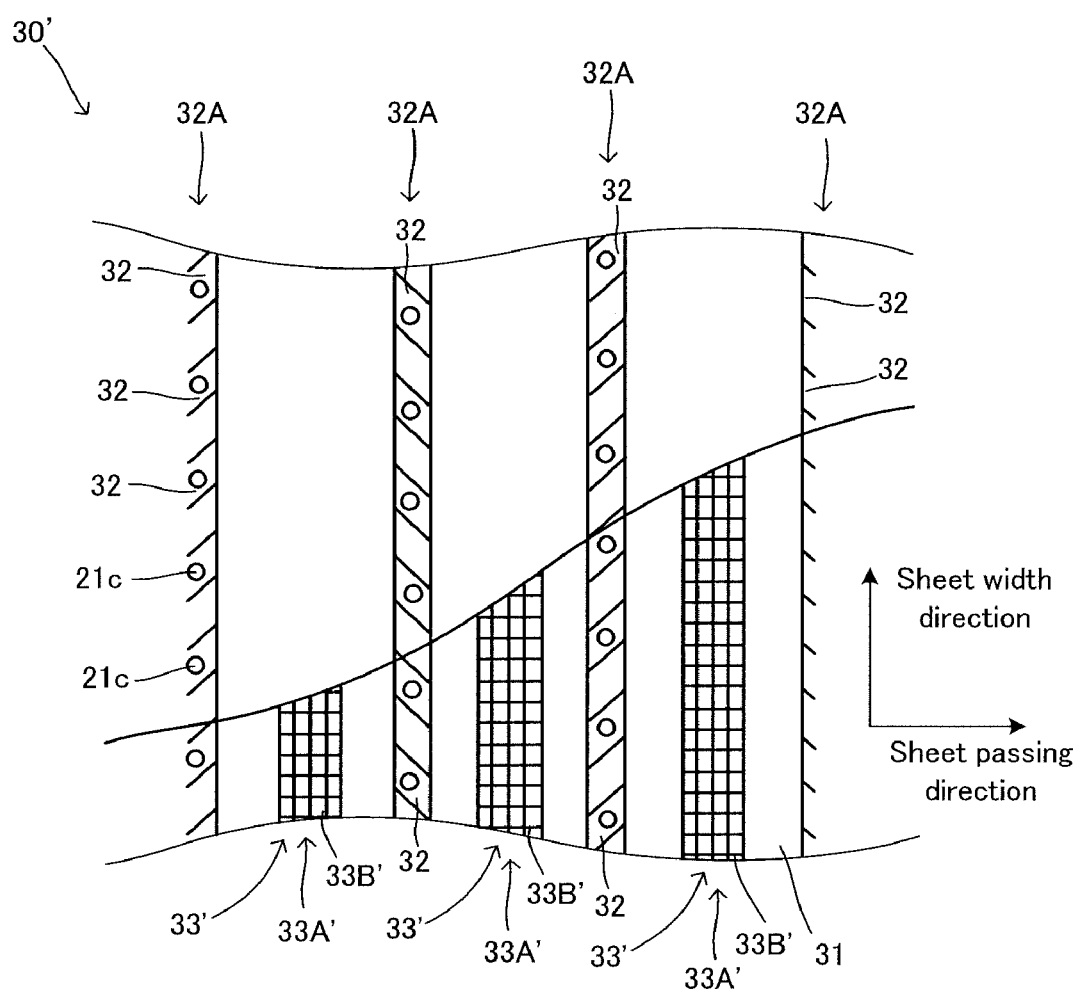
FIG. 5 illustrates another mode of an outlet hole of the upper surface guide.

FIG. 5 shows a modification of the outlet hole. The upper surface guide 30' shown in FIG. 5 as a modification is the same as the upper surface guide 30 except that the outlet hole 33' of the upper surface guide 30' is different, so the same reference symbols are given to the same portions and the descriptions are omitted. An outlet hole 33' of the upper surface guide 30' is configured to be one long hole 33A' in the width direction, on which a net material 33B' is spread. With this configuration as well, it is possible to form an outlet hole. To cause little influence on a flow of cooling water and to prevent such foreign substances as dirt from getting stuck, a so-called mesh size of the net material 33B' is preferably 5 mm×5 mm or more.

Further, among the edges of the outlet holes 33, 33, . . . , the edges orthogonal to the sheet passing direction comprise backflow preventing members 33p, 33p, . . . arranged to stand in an upward direction from the edges. These backflow preventing members 33p, 33p, . . . are arranged so as to prevent the water having entered the outlet holes 33, 33, . . . from flowing back again to the original position from the outlet holes 33, 33, . . . . By arranging these backflow preventing members 33p, 33p, . . . , it is possible to secure a larger amount of discharged water, thus improving water discharging ability.

In the embodiment, the backflow preventing members 33p, 33p, . . . are arranged to stand in approximately parallel with each other; however, the backflow preventing members may be arranged to stand in a manner that the upper end side of the members is narrower than the lower end. With this configuration, it is possible to secure a wide cross-sectional area of a flow path between the backflow preventing member and a standing member (35a, 35c) of a below described portion forming a water discharging passage.

As seen from FIG. 4B, portions 35, 35, . . . forming a water discharging passage are members extending in the width direction of the steel sheet, comprising a recess-shaped cross section surrounded with the members 35a, 35b, 35c. The portion 35 forming a water discharging passage is disposed in a manner overlaying the guide sheet 31 with the recess-shaped opening facing the guide sheet 31. At this point, the recess-shaped opening overlays the guide sheet 31 in a manner including a part of the upper surface of the guide sheet 31 and the row 33A of outlet holes therein, in other words, between the member 35a and the member 35c. Further, the portions 35, 35 forming a water discharging passage adjacent to each other have a predetermined spacing, in which the rows 32A, 32A, . . . of inlet holes and the cooling nozzles 21c, 21c, . . . are disposed.

Furthermore, as for the member 35b opposite to the row 33A of outlet holes, the member 35b on a side of the row 33A of outlet holes has a rectifying member 36 arranged at the position right above the row 33A of outlet holes. The rectifying member 36 is preferably shaped in a manner capable of rectifying discharge of water by separating the discharged water striking against the member 35b toward a bottom surface of the water discharging passage which is provided with the backflow preventing members 33p, 33p, as described below. Examples include an upside-down triangle, trapezoid, comb-like shape, or other protruding shapes.

Here, a height of the portions 35, 35 forming a water discharging passage is not particularly limited; however, when an inner diameter of the conduits 21b, 21b, . . . of the upper surface water supplying device 21 is defined as d, the height is preferably within a range of 5 d to 20 d. This is because, if the conduits 21b, 21b, . . . are longer than 20 d, a loss of pressure is increased, which is not preferable. Further, if the conduits are shorter than 5 d, ejection from the cooling nozzles 21c, 21c, . . . is unlikely to be stabilized.

The upper surface guide 30 is arranged as shown in FIG. 2. In the embodiment, three upper surface guides 30, 30, are used and are aligned in the sheet passing direction. All of the upper surface guides 30, 30, 30 are arranged so as to correspond to a position at a height of the cooling nozzles 21c, 21c, . . . . That is, in the embodiment, the upper surface guide 30 closest to the final stand 11g is arranged in a tilted manner to have its end portion on a side of the final stand 11g positioned lower and its end portion on the other side positioned higher. The other two upper surface guides 30, 30 are arranged in approximately parallel with the surface of the passing steel sheet, with a predetermined spacing from the surface of the passing steel sheet.

With this upper surface guide 30, it is possible, as a fundamental function of the upper surface guide 30, to solve a problem that a top end of a steel sheet gets stuck in the cooling nozzles 21c, 21c, . . . or the like when passing.

Further, with the upper surface guide 30, it is possible to appropriately discharge a large volume of cooling water supplied to the upper surface side of the steel sheet. First, after the steel sheet is cooled by the cooling water supplied by the upper surface water supplying devices 21, 21, . . . , a part of the cooling water flows in the width direction of the steel sheet and drops downwardly to be discharged. However, if a volume and a flow density of the supplied cooling water is large, this way of discharging water makes it impossible to discharge water in time, thus causing thickly-formed retained water. In this regard, by further providing a water discharging passage to the upper surface guide 30, it is possible to keep the retained water thin. Details are described as follows.

Figure 6:
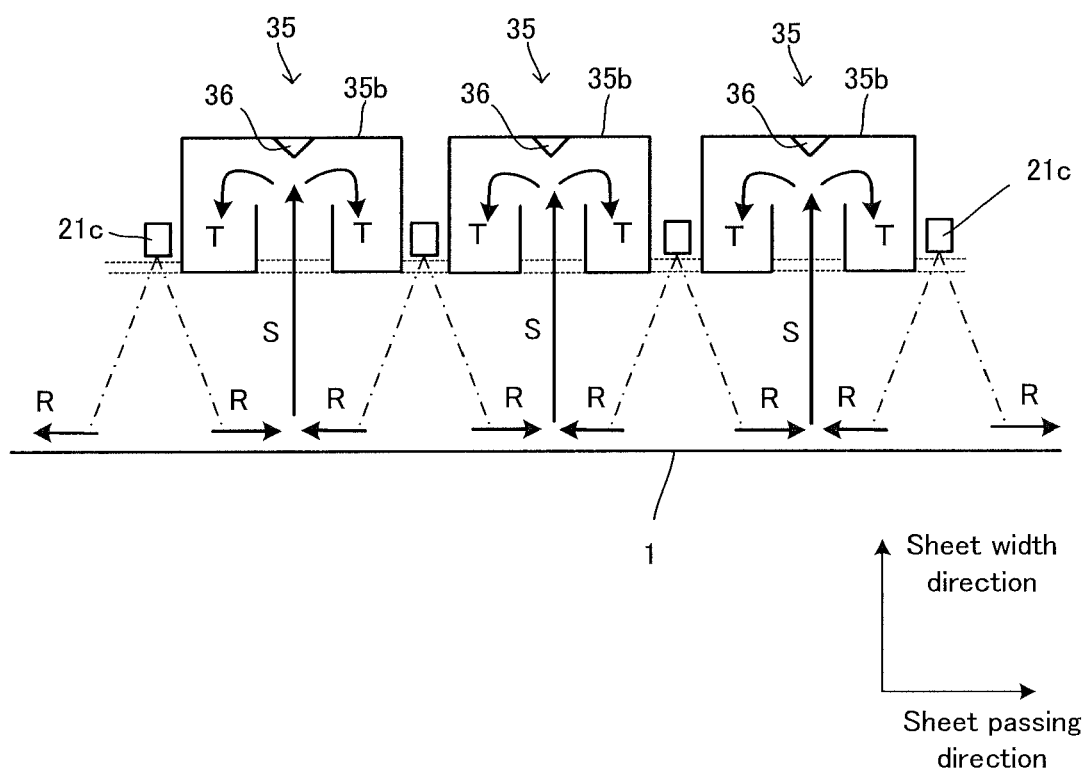
FIG. 6 is a view illustrating a flow of cooling water by the upper surface guide.

FIG. 6 is a view for the description. In FIG. 6, symbols are omitted for the purpose of easy understanding; as for the components corresponding to those in FIG. 4B, the symbols used therein may be referred to. In a case when a flow density of cooling water, and a volume of supplied cooling water are high enough to hinder water from being discharged in the width direction of the steel sheet in time, a force of the jet of the water from the cooling nozzles 21c, 21c, . . . is strong. In this case, the cooling water sprayed over the upper surface of the steel sheet 1 also moves back and forth in the sheet passing direction as shown in the arrows R, R in FIG. 6, and strikes against each other. The impact in this way causes the cooling water to change its direction; to move upward as shown by the arrow S; to pass through the outlet holes 33, 33, . . . ; and to strike against the member 35b of the portion 35 forming a water discharging passage. At this point, a wedge-shaped rectifying member 36 arranged on the member 35b as described above allows the cooling water to change its direction as shown by the arrows T, T. Then, a resistance of cooling water to this change in direction is suppressed to a small degree; thereby ensuring efficient water discharge.

By this, the cooling water having reached the upper surface side of the guide sheet 31 moves in a direction toward a back part or toward a front part on the sheet of FIG. 6, to be discharged. At this point, the backflow preventing members 33p, 33p, which are arranged at the edges of the outlet hole 33, inhibit the cooling water from flowing back again from the outlet hole 33.

In this way, by further providing the water discharging device, even in a case of the large volume and the high flow density of cooling water supplied to the upper surface side, it is possible to suppress the amount of retained water. Moreover, by the above configuration, together with separately arranging a hole to which cooling water is supplied and a hole through which the cooling water is discharged, it is possible to inhibit the cooling water which is supplied for cooling and the cooling water which has started moving to be discharged from striking against each other along the way. This facilitates water supply and water discharge, and lessens a thickness of the retained water, thereby enhancing a cooling efficiency.

By facilitating water discharge and suppressing the retained water in this way, it is also possible to reduce cooling nonuniformity in the width direction of the steel sheet. Thus, a steel sheet having a more uniform quality can be obtained. As to the cooling nonuniformity, nonuniformity of a temperature of the cooling water in the width direction of the steel sheet is preferably within ±30° C.

In the embodiment, the outlet holes 33, 33, . . . included in one row 33A of outlet holes are arranged over the entire region of the upper surface guide 30 in the width direction of the steel sheet; however, an arrangement is not limited to this. For example, these outlet holes may be provided only around the middle portion of the steel sheet in the width direction of the steel sheet, where the retained water tends to be thick.

In discharging the cooling water having reached the upper surface of the guide sheet 31, from both ends of the guide sheet 31 in the width direction of the steel sheet, a configuration to further improve the water discharging ability can be added. Examples include the following.

The upper surface side of the guide sheet 31 may be configured to have its middle portion in the width direction of the steel sheet formed to be higher, and may arrange a slope lowering toward both ends in the width direction of the steel sheet. With this configuration, because of the height differences, it becomes easier for the cooling water to move toward both ends of the guide sheet 31 in the width direction of the steel sheet, thereby further facilitating water discharge.

Further, by forcefully discharging water with a pump or the like, or by applying negative pressure inside the portion forming a water discharging passage and making it easy to guide the cooling water into the portion forming a water discharging passage, water discharging ability may be further improved.

Still further, a configuration may also be provided in which the upper surface guide is formed in a manner movable in an upward and downward direction by itself and is made to move downwardly to a degree not affecting passing of a steel sheet, thereby compressing the retained water to be forcefully guided into the portion forming a water discharging passage.

Furthermore, the edges of the outlet holes 33, 33, . . . provided to the guide sheet 31, or the edges of both ends of the guide sheet in the width direction of the steel sheet may be chamfered or rounded (i.e. formed in an arc-like shape). This configuration can prevent the passing steel sheet from getting stuck and can facilitate a smooth flow of cooling water.

A material of the guide sheet 31 may be a common material having strength or heat resistance which are required to function as a guide, and the material is not particularly limited. However, for the purpose of reducing scratches and the like in the steel sheet 1 at a time when the passing steel sheet 1 contacts with the guide sheet 31, a material such as resin and the like which is softer than the steel sheet 1 may be used for a portion which does not cause a problem in strength and heat resistance.

Figure 7A:
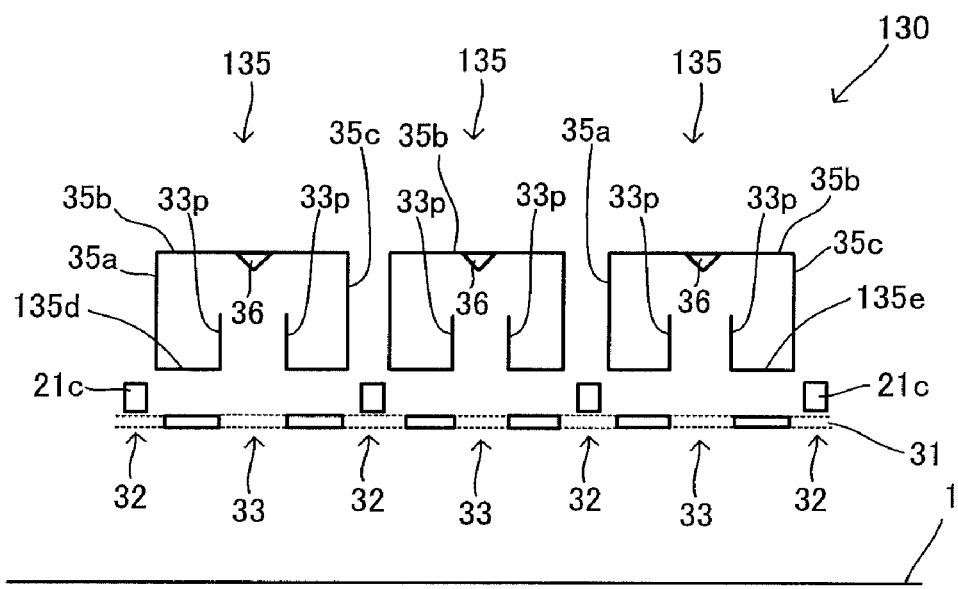
FIG. 7 is a view showing another mode of the upper surface guide.
Figure 7B:
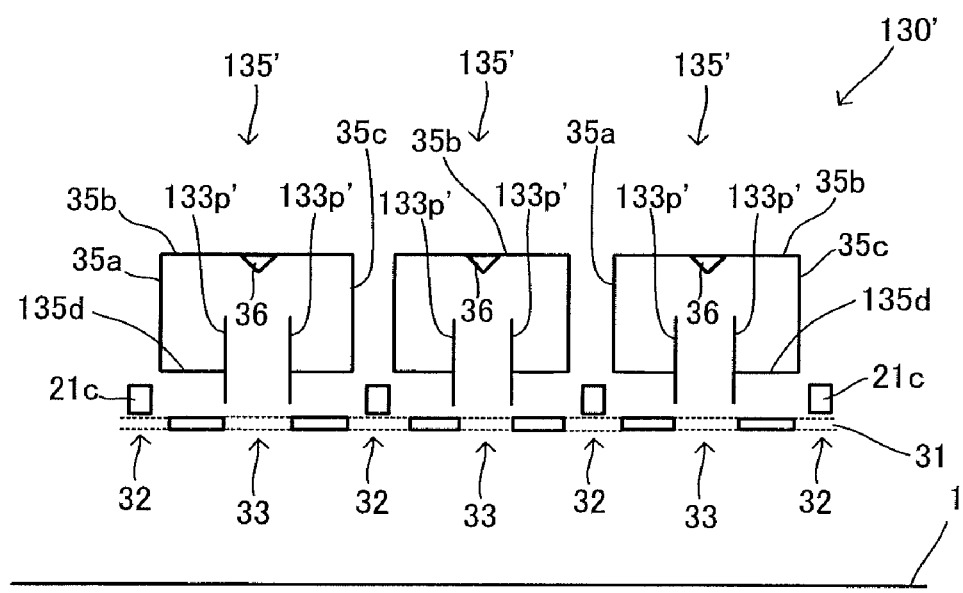

FIG. 7 shows a part of the upper surface guides 130, 130' in another embodiment, the part corresponding to that shown in FIG. 4B. FIG. 7A shows the upper surface guide 130, and FIG. 7B shows the upper surface guide 130'. Here, with regard to the members in common with those of the upper surface guide 30, the same symbols are given, and the descriptions are omitted.

In the upper surface guide 130, portions 135, 135, . . . forming a water discharging passage are configured to be separated from the guide sheet 31. Thus, in the portions 135, 135, . . . forming a water discharging passage, the members 35a, 35a, . . . and the backflow preventing members 33p, 33p, . . . are connected to each other by bottom sheets 135d, 135d, . . . . Further, the members 35c, 35c, . . . and the backflow preventing members 33p, 33p, . . . are connected to each other by bottom sheets 135e, 135e, . . . ; and the bottom sheets 135d, 135d, . . . and the bottom sheets 135e, 135e, . . . form a bottom portion of the water discharging passage. In this way, the upper surface guide 130 may be configured to have the portions forming a water discharging passage separated from the guide sheet.

The upper surface guide 130' is configured to have the backflow preventing members 133p', 133p', . . . extending further toward the upper surface side of the guide sheet 31.

Figure 8A:
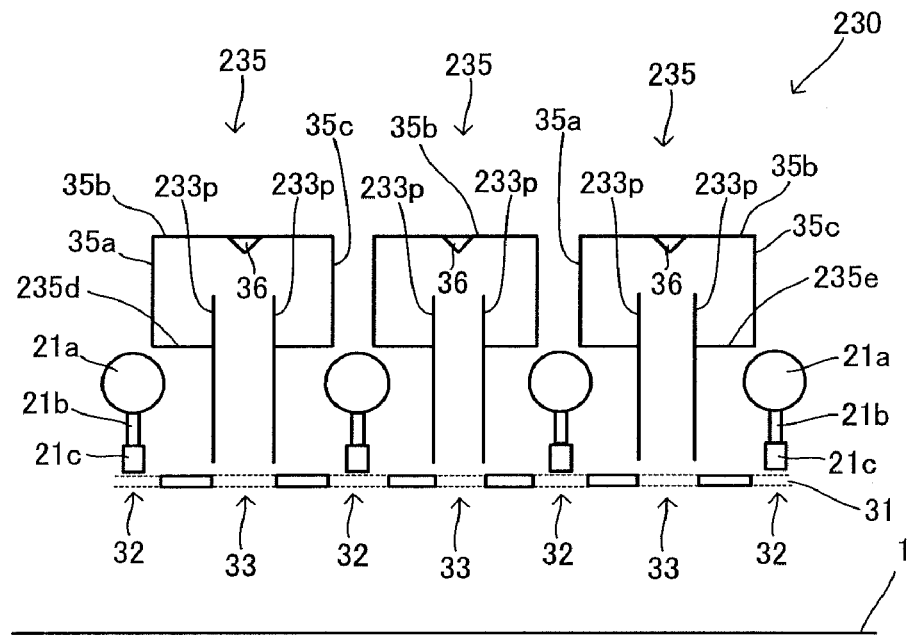
FIG. 8 is a view showing still another mode of the upper surface guide.
Figure 8B:
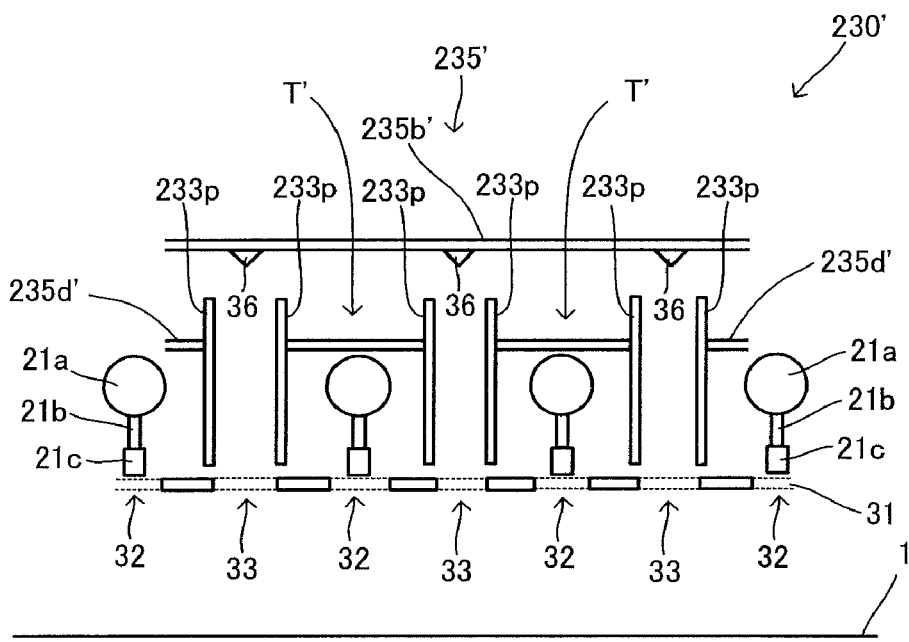

FIG. 8 shows a part of the upper surface guides 230, 230' in still another embodiment, the part corresponding to that shown in FIG. 4B. FIG. 8A shows the upper surface guide 230, and FIG. 8B shows the upper surface guide 230'. Here, with regard to the members in common with those of the upper surface guides 30, 130, the same symbols are given, and the descriptions are omitted.

In the upper surface guide 230 as well, portions 235, 235, . . . forming a water discharging passage are formed in a manner being separated from the guide sheet 31. Thus, in the portions 235, 235, . . . forming a water discharging passage, the members 35a, 35a, . . . and the backflow preventing members 233p, 233p, . . . are connected to each other by bottom sheets 235d, 235d, . . . ; and the members 35c, 35c, . . . and the backflow preventing members 233p, 233p, . . . are connected to each other by bottom sheets 235e, 235e, . . . . The bottom sheets 235d, 235d, . . . and the bottom sheets 235e, 235e, . . . form a bottom portion of the water discharging passage. Further, the backflow preventing members 233p', 233p', . . . extend toward the upper side of the guide sheet 31. The upper surface guide 230, comprises not only the cooling nozzles 21c, 21c, . . . but also the headers 21a, 21a . . . , and the conduits 21b, 21b, . . . between the guide sheet 31 and the portions 235, 235, . . . forming a water discharging passage. The upper surface guide 230 may be configured in this way.

The surface guide 230' comprises one portion 235' forming a water discharging passage by combining the portions 235, 235, . . . forming a water discharging passage adjacent to each other in the upper surface guide 230. With this configuration as well, it is possible to secure a water discharging pathway shown as T', T' in FIG. 8B; thereby securing a large cross sectional area of a flow path of the water discharging pathway (T').

Figure 9A:
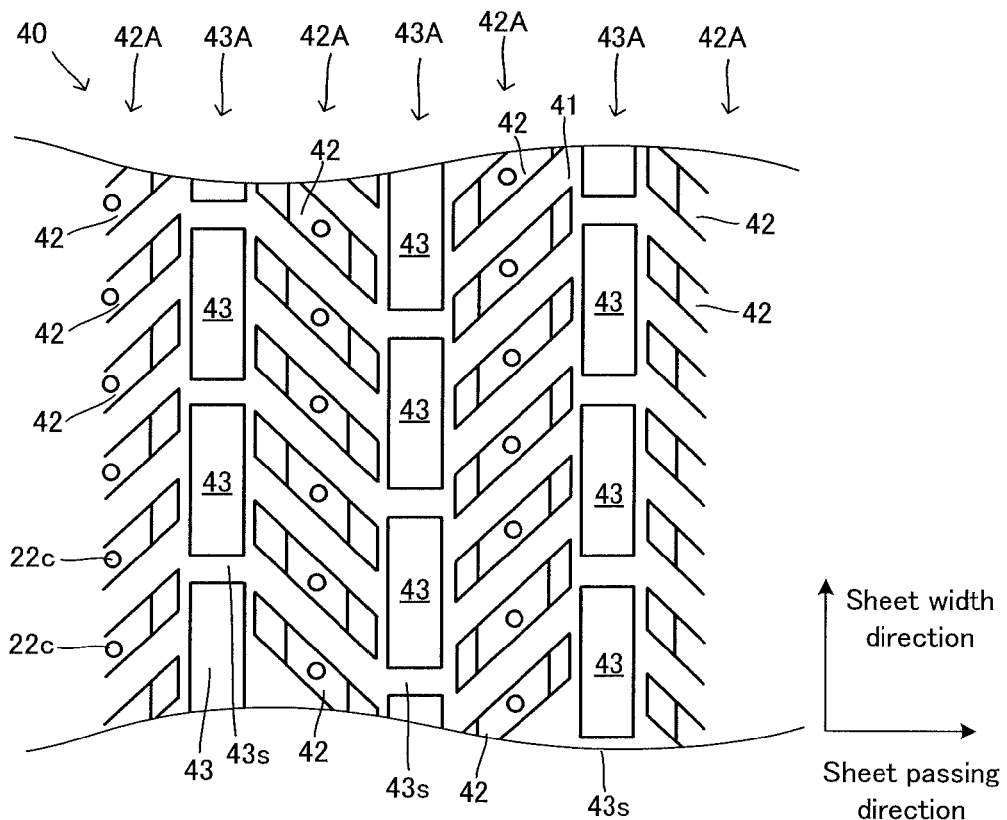
FIG. 9 is a view illustrating a lower surface guide.
Figure 9B:
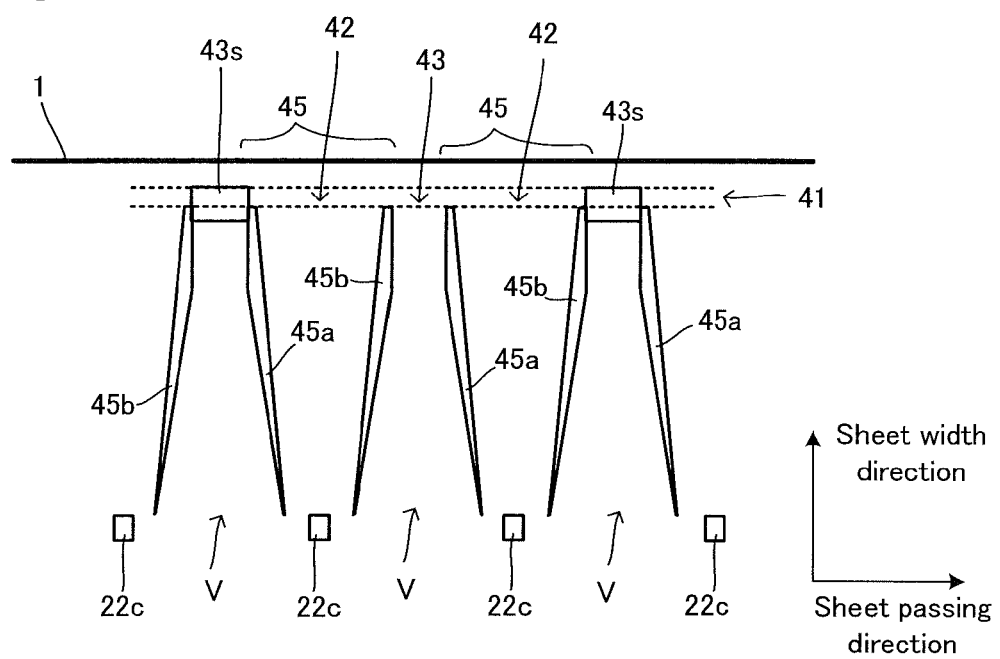

Next, a lower surface guide 40 will be described. The lower surface guide 40 is schematically shown in FIG. 9. FIG. 9A is a view seen from an upper side of the cooling apparatus 20. FIG. 9B is a view seen from the side surface of the cooling apparatus. FIG. 9 also shows a position of the cooling nozzles 22c, 22c, . . . and a position of the steel sheet 1.

The lower surface guide 40 comprises: a guide sheet 41, which is in a sheet shape; and a portion 45 forming a water supplying and discharging passage, which is disposed on the lower surface side of the guide sheet 41.

The guide 41 is a sheet-like member, and is provided with inlet holes 42, 42, . . . , and outlet holes 43, 43, . . . .

The inlet holes 42, 42, . . . are arranged at a position corresponding to each of the cooling nozzles 22c, 22c, . . . described above. Thus, the inlet holes 42, 42, . . . are aligned in the width direction of the steel sheet to form a row 42A of inlet holes. The rows 42A, 42A, . . . of inlet holes are also aligned in the sheet passing direction. Each cooling nozzle 22c is preferably provided with one inlet hole 42 corresponding to the cooling nozzle; this makes it possible to appropriately separate the supplied water and the discharged water and to facilitate water discharge.

A shape of an opening of the inlet holes 42, 42, . . . is not particularly limited; however, the shape is preferably formed in a manner that the jets of water from the cooling nozzles 22c, 22c, . . . hit against the guide sheet 41 as little as possible so that the cooling water can efficiently pass through the inlet hole. Specifically, though it depends on the characteristics of the jet from the cooling nozzle used, the inlet holes are preferably in a shape which allows the cooling water to pass without having 10% or more of a total volume of the cooling water ejected from one cooling nozzle 22c per time unit strike against the guide sheet 41 of the lower surface guide 40.

Further, to efficiently arrange the inlet holes 42, 42, . . . in a limited space, it is preferable that the shape of the opening of the inlet hole be substantially similar to a cross-sectional shape of a jet of cooling water (a cross section orthogonal to a direction of an ejection axis).

On the other hand, the outlet holes 43, 43, . . . are configured to be rectangular holes; and a plurality of the outlet holes are aligned in the width direction of the sheet to form a row 43A of outlet holes. By having a part of the guide sheet 41 remain between the outlet holes 43, 43, . . . , a top portion of the transported steel sheet is prevented from entering the outlet holes 43, 43, . . . . This becomes a device 43s, 43s, . . . for preventing entering of a steel sheet. The rows 43A, 43A, . . . of outlet holes are disposed between the above described rows 42A, 42A, . . . of inlet holes.

That is, the row 42A of inlet holes and the row 43A of outlet holes are arranged alternately on the guide sheet 41 along the sheet passing direction.

A size (Lg) of the outlet holes 43, 43, . . . in the sheet passing direction is not particularly limited as long as it enables appropriate water discharge; for example, the outlet hole may be formed in a way that satisfies the following formula (1)

$$\alpha \cdot W \cdot H \leq (Lg \cdot W - N \cdot Lg \cdot Wg)/2 \quad (1)$$

Here, W refers to a size of the lower surface guide 40 in the width direction of the sheet; H refers to a distance between the upper surface of the lower surface guide 40 and the lower surface of the passing steel sheet 1; Wg refers to a size of the device 43s for preventing entering of a steel sheet in the width direction of the sheet; and N refers to the number of the devices 43s for preventing entering of a steel sheet disposed in the width direction of the sheet. α is a coefficient, and in the below described example (also see FIG. 13), α=0.5 is an appropriate value.

According to this, a right side of the formula (1) shows a total area of the opening of the outlet holes 43, 43, . . . . A left side of the formula (1) shows a cross-sectional area of a passage through which cooling water, after being sprayed, moves until it reaches the outlet holes 43, 43, . . . (i.e. a passage between the upper surface of the lower surface guide 40 and the lower surface of the steel sheet 1). And by making the total area of the opening of the outlet holes 43, 43, . . . , which is on the right side of the formula, larger than the area determined by the cross-sectional area of the flow path on the left side of the formula, it is possible to suppress resistance to water discharge to a small degree.

A material of the guide sheet 41 may be a common material having strength or heat resistance which are required to function as a guide, and the material is not particularly limited. However, for the purpose of reducing scratches and the like in the steel sheet 1 at a time when the passing steel sheet 1 contacts with the guide sheet 41, a material such as resin and the like which is softer than the steel sheet 1 may be used for a portion which does not cause a problem in strength and heat resistance.

Furthermore, the edges of the inlet holes 42, 42, . . . and the edges of the outlet holes 43, 43, . . . provided to the guide sheet 41, may be chamfered or rounded (i.e. formed in an arc-like shape). This configuration can reduce the degree to which the passing steel sheet gets stuck and facilitate a smooth flow of the cooling water.

As a preferable shape of an opening of the outlet holes 43, 43, . . . , the rectangular shape of the openings aligned has been described as above. This configuration makes it possible to efficiently obtain a large area of an opening in a limited space; however, the shape is not limited to this as long as it is possible to secure an adequate amount of discharged water and to prevent a steel sheet from getting stuck. Namely, the shape of the opening of the outlet hole is not limited to the rectangular shape as described above; it may be a circular and trapezoidal shape. And the shape of the device for preventing entering of a steel sheet corresponds to the shape of the opening. For example, when the outlet hole is in a trapezoidal shape having a top base and a bottom base in the sheet passing direction, the device for preventing entering of a steel sheet may be in a parallelogram shape leaning away from the sheet passing direction.

Figure 10:
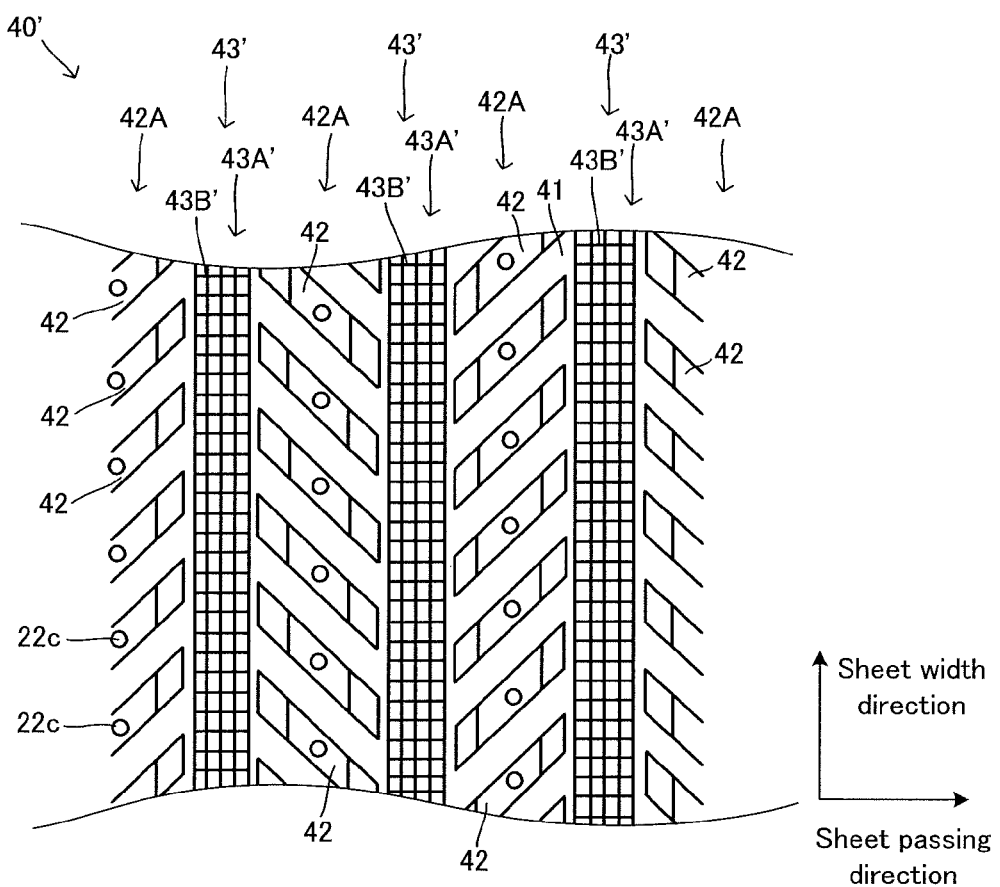
FIG. 10 illustrates another mode of an outlet hole of the lower surface guide.

FIG. 10 shows a modification of the outlet hole. The lower surface guide 40' shown in FIG. 10 as a modification is the same as the lower surface guide 40 described above, except that the outlet hole 43' of the lower surface guide 40' is different; so, the same symbols are given to the same portions and the descriptions are omitted. An outlet hole 43' of the lower surface guide 40' is configured to be one long hole 43A' in the width direction of the steel sheet, on which a net material 43B' is spread. With this configuration as well, it is possible to form an outlet hole. To have little influence on a flow of cooling water and to prevent such foreign substances as dirt from getting stuck, a so-called mesh size of the net material 43B' is preferably 5 mm×5 mm, or more.

Back to FIG. 9, a member 45 forming a water supplying and discharging passage will be described. The member 45 forming a water supplying and discharging passage comprises a pair of sheet-shaped members 45a, 45b arranged, in a manner hanging downwardly from the lower surface side of the guide sheet 41, on a boundary between a row 42A of inlet holes and rows 43A, 43A of outlet holes adjacent to the row 42A of inlet holes. Thus, inlet holes 42, 42, . . . are disposed between the upper end portions of the pair of the sheet-shaped members 45a, 45b. And the outlet holes 43, 43, . . . and the devices 43s, 43s, . . . for preventing entering of a steel sheet are disposed on the upper end portion between the members 45, 45 forming a water supplying and discharging passage adjacent to each other.

In the embodiment, as seen from FIG. 9B, the lower surface sides of the devices 43s, 43s, . . . for preventing entering of a steel sheet in the guide sheet 41 are formed to be slightly thicker. And, the upper end portions of the sheet-shaped members 45a, 45b are attached, by welding, to the lower surface of the guide sheet 41 and to the thickly formed side surfaces of the devices 43s, 43s, . . . for preventing entering of a steel sheet.

In the embodiment, a configuration of attachment by welding is described. However, the sheet-shaped members may be fixated by such a fixating means as a screw, or an adhesive; so a configuration of attachment is not particularly limited to the embodiment. Here, although the guide sheet 41 and the member 45 forming a water supplying and discharging passage are unified, the configuration does not necessarily have to be this way. However, since the member forming a water supplying and discharging passage forms a water supplying passage and a water discharging passage, it is preferable that there be little gap which allows communication therebetween, in view of which, unification by welding has been described in the embodiment.

The lower end portion of the member 45 forming a water supplying and discharging passage (i.e. the lower end portion of the sheet-shaped members 45a, 45b) is narrowly spaced and the cooling nozzle 22c is disposed therein. In association with this, a lower end portion between the members 45, 45 forming a water supplying and discharging passage adjacent to each other is widely spaced as shown by V in FIG. 9B. A shape of the space is preferably formed in manner to match the shape of the water sprayed from the cooling nozzles 22c, 22c, . . . .

The lower surface guide 40, which has been described above is disposed as shown in FIG. 2. In the embodiment, four lower surface guides 40, 40, . . . are used and each of the lower surface guides are disposed between the transporting rolls 12, 12, 12. All of the lower surface guides 40, 40, . . . are disposed at a position which is not too low in relation to the upper end portion of the transporting rolls 12, 12, . . . .

With this lower surface guide 40, it is possible, as a fundamental function of the lower surface guide 40, to solve a problem that a top portion of the steel sheet gets stuck between the transporting rolls 12, 12.

Further, the lower surface guide 40 enables appropriate discharge of a large volume of cooling water supplied to the lower surface side of the steel sheet. Details are described as follows.

Figure 11A:
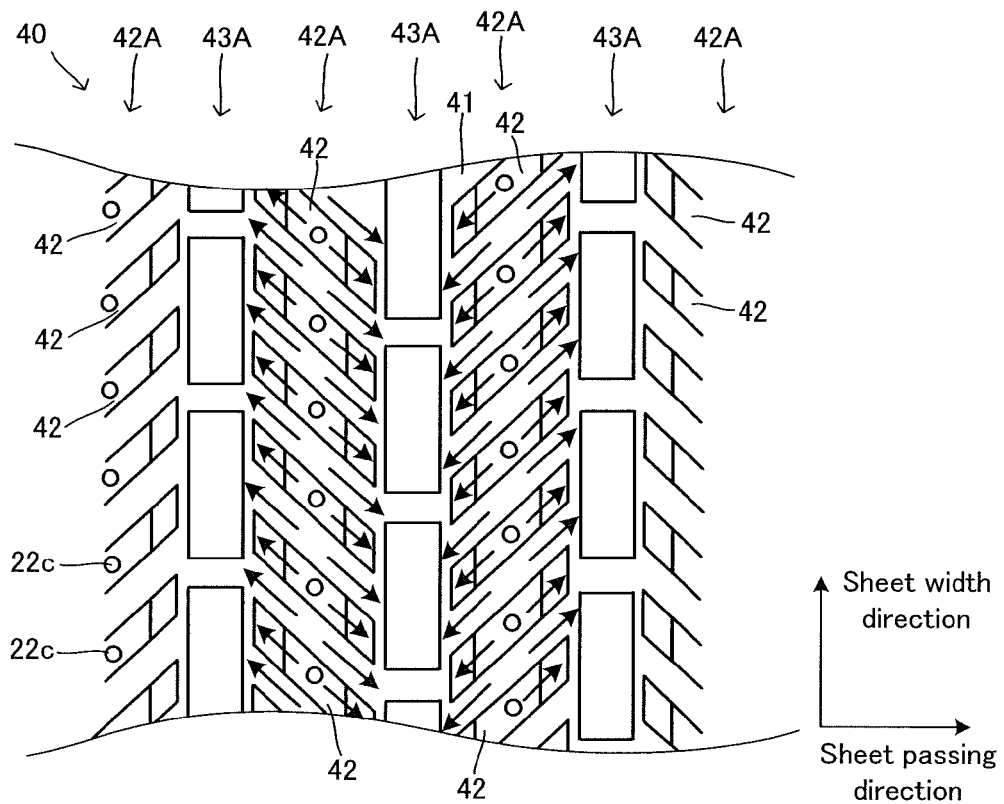
FIG. 11 is a view illustrating a flow of cooling water by the lower surface guide.

FIG. 11 is a view for the description. In FIG. 11, reference symbols are omitted for the purpose of easy viewing; as for the components corresponding to those in FIG. 9, the symbols used in FIG. 9 may be referred to.

Figure 11B:
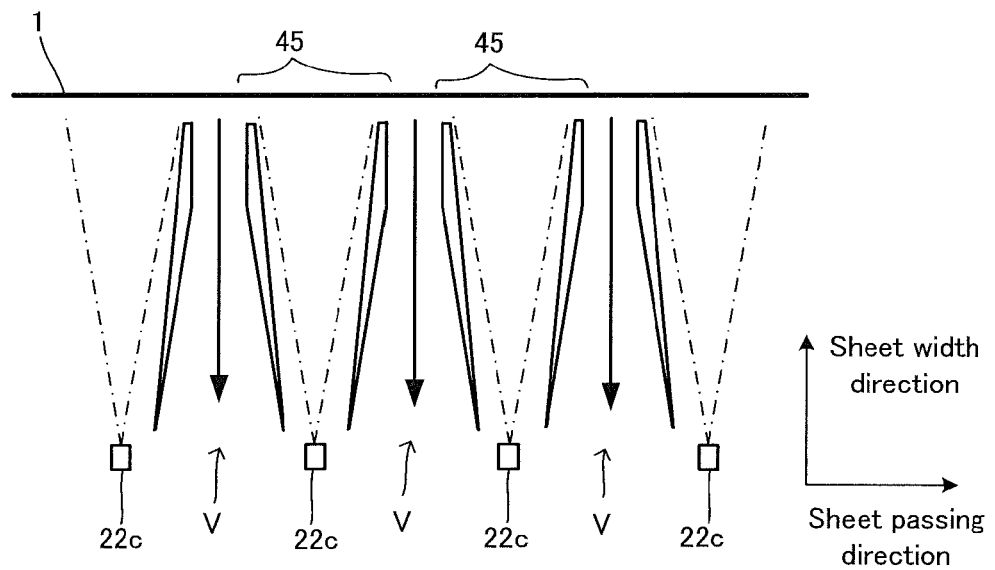

Cooling water sprayed from the cooling nozzle 22c passes between the sheet-shaped members 45a, 45b; reaches the lower surface of the steel sheet 1 from the inlet hole 42, and cools the steel sheet 1 (FIG. 11B). After that, the cooling water moves on the upper surface of the guide sheet 41 in a direction shown by the linear arrow in FIG. 11A, and drops downwardly from the outlet holes 43, 43 to be discharged, as shown by the linear arrow in FIG. 11B.

In this way, since not only a hole for supplying water and a hole for discharging water are separated but a passage for supplying water and a passage for discharging water are also separated, the cooling water supplied for cooling and the discharged water can be prevented from striking against each other along the way. It is thus possible to facilitate water supply and discharge, and to suppress the amount of retained water, thereby enhancing a cooling efficiency. Particularly, since the cooling nozzles 22c, 22c, . . . are located right below the member 45 forming a water supplying and discharging passage, the passage for discharging water extends to the vicinity of a right and a left of the cooling nozzles 22c, 22c, . . . , which enables prevention of the discharged water from affecting the cooling nozzles 22c, 22c, . . . .

In the lower surface guide, 80% or more of the cooling water supplied by the lower surface water supplying device is preferably discharged from the outlet hole. This ensures a very high cooling efficiency.

Further, by facilitating water discharge in this way, it is possible to suppress the amount of retained water, thereby reducing cooling nonuniformity in the width direction of the steel sheet. Then, a steel sheet having a more uniform quality can be obtained. As to the cooling nonuniformity, nonuniformity of a temperature of the cooling water in the width direction of the steel sheet is preferably within ±30° C.

As described above, in the embodiment, the space in the lower end portion between the sheet-shaped members 45a, 45b, which form a water supplying passage is narrowly formed. In association with this, the space in the lower end portion between the sheet-shaped members 45a, 45b, which form a water discharging passage is widely formed. With this configuration, a water discharging passage is expanded, further facilitating water discharge.

Figure 12A:
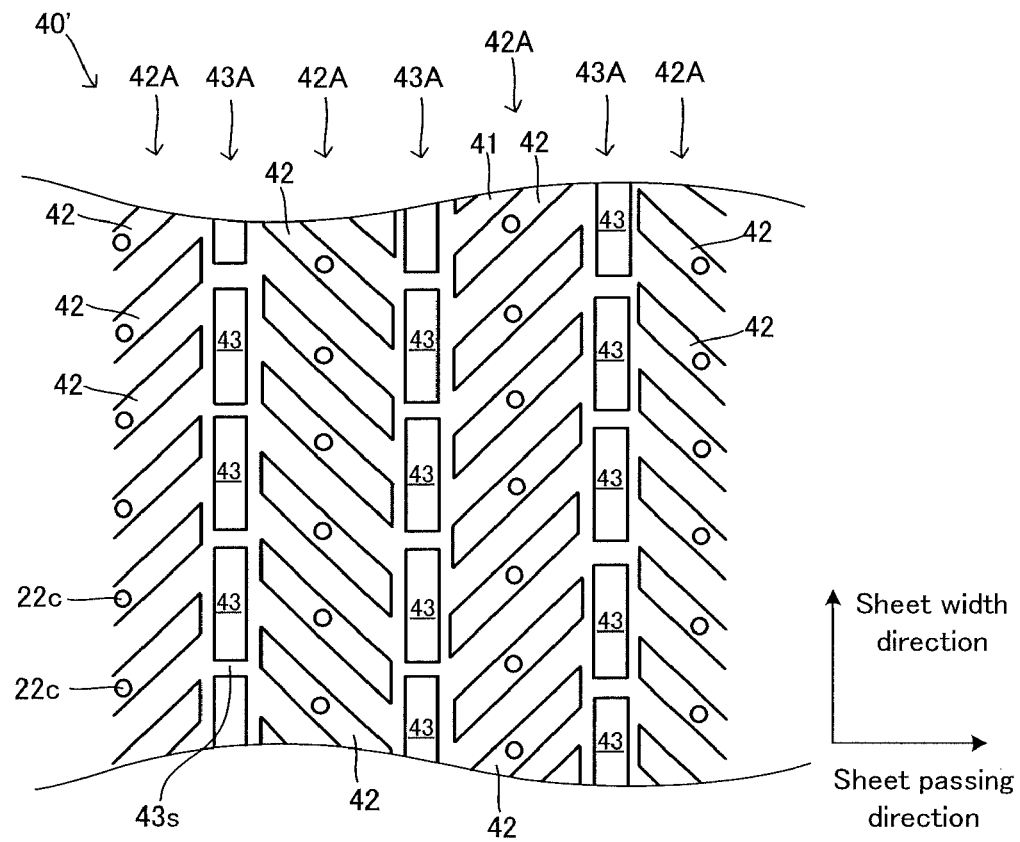
FIG. 12 is a view illustrating another mode of the lower surface guide.
Figure 12B:
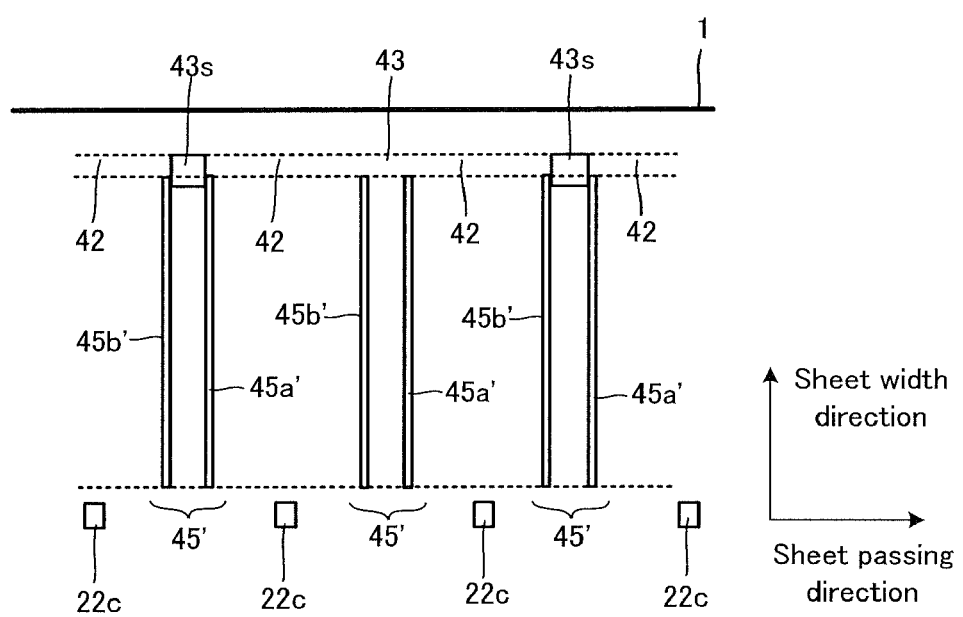

However, the sheet-shaped member of the member forming a water supplying and discharging passage does not necessarily have to be inclined in this way; it can be vertically hung downwardly. The lower surface guide 40' in this mode is shown in FIG. 12. FIG. 12 corresponds to FIG. 9, and the lower surface guide 40' is the same as the lower surface guide 40 except that the sheet-shaped members 45a', 45b' of the lower surface guide 40' vertically extend downwardly. The lower surface guide may be configured in this way.

Further, looking at the vicinity of the work roll 11gw (for example, FIG. 2B), there is the work roll 11gw; and on the downstream side thereof is arranged a winding prevention guide not shown in a figure, which prevents the top portion of the steel sheet 1 from winding up the work roll 11gw. And the lower surface guide 40 is arranged on the downstream side of the winding prevention guide. At this point, among the row 43A of outlet holes and the row 42A of inlet holes, the row 43A of outlet holes is preferably closest to the winding prevention guide. This enables facilitation of water discharge in the vicinity of the work roll 11gw. Further, the winding prevention guide and the lower surface guide may be unified.

Looking at the vicinity of the upstream side of the transporting roll 12 and the pinch roll 13 in the lower surface guide 40, it is preferable to arrange the row 42A of inlet holes, and next the row 43A of outlet holes; and then to arrange the transporting roll 12 or pinch roll 13, in the mentioned order from the upstream side. With this arrangement, water discharge in the vicinity of the upstream side of the transporting roll 12 and the pinch roll 13 can be facilitated.

On the other hand, looking at the vicinity of the downstream side of the transporting roll 12 and a pinch roll 13 in the lower surface guide, it is preferable to arrange the transporting roll 12 or pinch roll 13, and next the row 43A of outlet holes; and then to further arrange the row 42A of inlet holes, in the mentioned order from the upstream side. This arrangement enables facilitation of water discharge in the vicinity of the downstream side of the transporting roll 12 and the pinch roll 13.

That is, among the row of outlet holes and the row of inlet holes of the lower surface guide, the row of outlet holes is preferably disposed closely to the equipment, which is arranged in a manner cutting across the production line in the width direction of the steel sheet, or in a manner cutting across the transporting direction of the steel sheet 1 (, the equipment being the work roll 11gw, the transporting roll 12, and the pinch roll 13 in the above embodiment). This is because in order to spray cooling water at high pressure, it is necessary to facilitate water discharge from an area at which the cooling water is sprayed, and thus because it is effective to dispose an outlet hole in this type of area where discharging cooling water is difficult. Examples of the equipment include a work roll and a pinch roll, the roll of which contacts with the steel sheet; and include a water removing roll, the roll of which is located in the vicinity of the steel sheet.

Especially in the vicinity of the work roll, there is a large volume of water due to rapid cooling therein, and a housing is arranged to stand on both sides in the width direction of the steel sheet, making it difficult to discharge water in the area. Therefore, it is effective to dispose a row of outlet holes most closely to the work roll as described above.

Besides, the winding prevention guide, which prevents the top portion of the steel sheet 1 from winding up the work roll, is in contact with the work roll. However, other rolls such as a pinch roll usually do not have this kind of winding prevention guide. Therefore, originally there is often a gap except between the lower surface guide and the work roll. The gap may be used as an outlet hole.

Back to FIG. 2, the manufacturing apparatus 10 of a hot-rolled steel sheet will be described. The transportation rolls 12, 12, . . . are a table for the steel sheet 1 and are also a roll which transports the steel sheet 1 in the sheet passing direction. As described above, the lower surface guides 40, 40, . . . are arranged between the transporting rolls 12, 12, . . . .

The pinch roll 13 also functions to remove water, and is arranged on the downstream side of the cooling apparatus 20. This pinch roll can prevent cooling water sprayed in the cooling apparatus 20 from flowing out to the downstream side of the steel sheet 1. Furthermore, the pinch roll prevents the steel sheet 1 from ruffling in the cooling apparatus 20, and improves a passing ability of the steel sheet 1 especially at a time before the top portion of the steel sheet enters in the coiler. Here, an upper-side roll 13a of the pinch roll 13 is movable upside down, as shown in FIG. 2.

From above, it is possible, in a production line of a hot-rolled steel sheet, to provide: a cooling apparatus of a steel sheet which is excellent in discharging water even when a high flow density and a large volume of cooling water is supplied, without hindering a movement of a steel sheet (sheet passing); and to provide a manufacturing apparatus and manufacturing method of a hot-rolled steel sheet, thereby enabling manufacturing of a hot-rolled steel sheet with excellent mechanical properties.

In discharging cooling water by the upper surface guide and the lower surface guide, as above, a specific water discharging performance is adequately determined based on an amount of heat required to cool a steel sheet; thus the performance is not particularly limited. However, as described above, in view of obtaining a fine-grained steel sheet, rapid cooling immediately after rolling is effective, which is why cooling water in a high flow density is preferably supplied. Therefore, in discharging water on the upper surface guide and the lower surface guide as well, it is preferable to ensure a water discharging performance corresponding to the volume and the flow density of the supplied cooling water. In view of making a steel sheet with a fine-grained structure, an example of a flow density of supplied cooling water is 10-25 $m^3/(m^2 \cdot min)$. The flow density may be higher than this.

In the embodiment, the manufacturing apparatus, and the cooling apparatus which is provided with the upper surface guide and the lower surface guide have been described as a preferred embodiment; however, the embodiment is not limited to this. A conventional upper surface guide may be used while using the above described lower surface guide.

A steel sheet is manufactured by the above described manufacturing apparatus of a hot-rolled steel sheet, for example, in the following way. A steel sheet is coiled by a coiler, and the ejection of cooling water in the cooling apparatus 20 is stopped during a non-rolling time until rolling of the next steel sheet is started. During the non-rolling time, the upper-side roll 13a of the pinch roll 13 on the downstream side of the cooling apparatus 20 is moved up to a position higher than the upper surface guide 30 of the cooling apparatus 20; then rolling of the next steel sheet 1 is started.

A few seconds before a top portion of the next steel sheet 1 enters the final stand 11g of the row 11 of hot finish rolling mills, the ejection of cooling water by the cooling apparatus 20 is started. And immediately after the top portion of the steel sheet passes through the cooling apparatus 20, the ejection pressure of the cooling water is controlled to have an approximately predetermined value. Further, immediately after the top portion of the steel sheet 1 passes through the pinch roll 13, the upper side roll 13a is lowered to start pinching the steel sheet 1.

By starting spraying cooling water before the top portion of the steel sheet 1 is transported into the cooling apparatus 20, it is possible to shorten a length of an unsteady cooling portion of the top portion of the steel sheet 1. In addition to this, the sprayed cooling water is capable of stabilizing a passing ability of the steel sheet 1. In other words, in a case when the steel sheet 1 rises, trying to come close to the upper surface guide 30, an impact force received from the jets of cooling water sprayed by the cooling nozzles 21c, 21c, increases and a vertically downward force acts on the steel sheet 1. As such, even in a case when the steel sheet 1 strikes against the upper surface guide 30, the impact of the steel sheet on the upper surface guide is eased by the impact force received from the jets of cooling water. Also, since a friction heat between the steel sheet 1 and the upper surface guide 30 is reduced, it is possible to reduce abrasion defects produced on the surface of the steel sheet 1.

Therefore, if a hot-rolled steel sheet is manufactured by a manufacturing apparatus of a hot-rolled steel sheet comprising the cooling apparatus 20 operated as above on the downstream side of the row 11 of hot finish rolling mills, cooling with a high flow density and a large volume of cooling water becomes possible. In other words, by manufacturing a hot-rolled steel sheet with the manufacturing method, the hot-rolled steel sheet with a fine-grained structure is obtained.

Further, a sheet passing rate in the row 11 of hot finish rolling mills can be kept constant except for the area in which the steel sheet starts to pass. This enables manufacturing of a steel sheet with an enhanced mechanical strength over the entire length of the steel sheet 1.

EXAMPLES

The present invention will be described below more in detail on a basis of examples, to which the present invention is not limited. In the examples, the water discharging performance was measured by making a lower surface guide having the shape of the lower surface guide 40.

Figure 13:
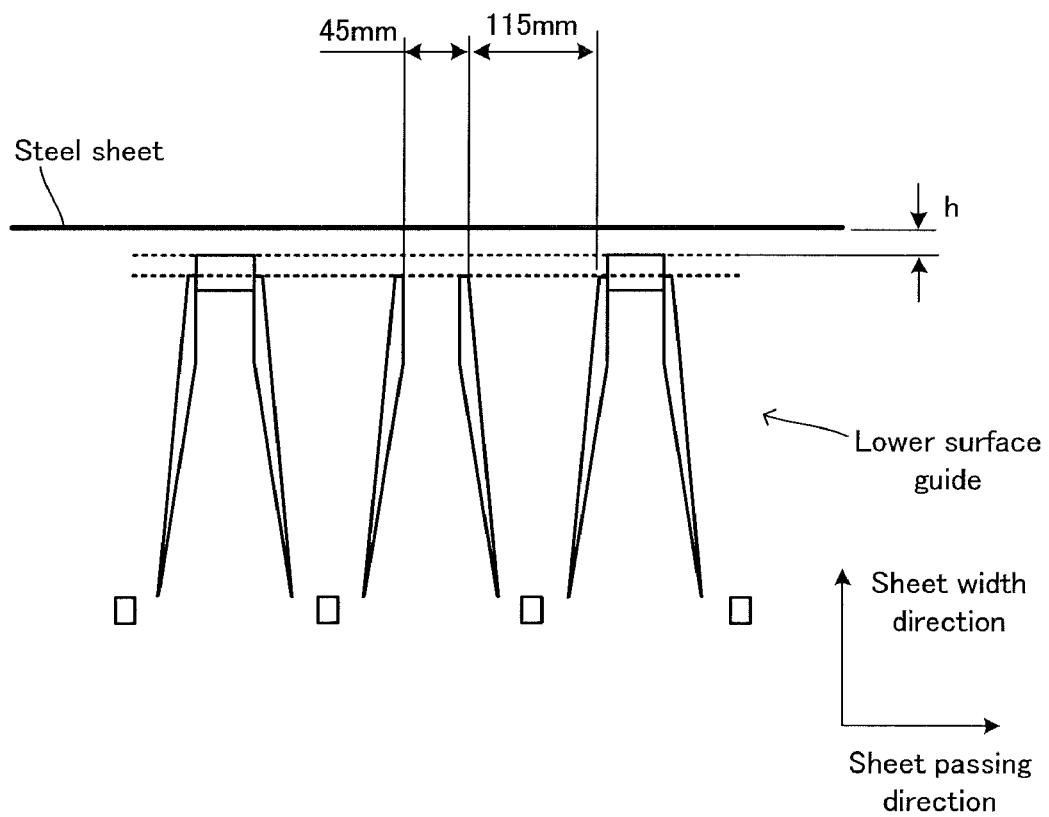
FIG. 13 is a view showing a measurement of the lower surface guide according to an example.

FIG. 13 shows a primary measurement of the above made lower surface guide. Specifically, a size of an inlet hole in the sheet passing direction is set at 115 mm, and a size of an outlet hole in the sheet passing direction is set at 45 mm. Then, water supply and discharge were performed by changing the distance between the lower surface of the passing steel sheet and the upper side of the lower surface guide. Cooling water was supplied by a flat spray nozzle at a flow rate of 15 $m^3/(m^2 \cdot min)$. As a reference, a case in which the lower surface guide was not provided is also shown, the case being seen to be most excellent in discharging water.

Here, by using the flat spray nozzle, it is possible to increase, with a small number of cooling nozzles, an area of an impact region of jets of water with a high cooling capability. Further, compared to a cooling nozzle of a slit jet supplying a film-like jet of water in the width direction of the steel sheet, the flat spray nozzle can more easily maintain a uniform jet of water in the width direction of the steel sheet, thereby enabling increase in cooling uniformity.

Results are shown in Table 1. The results are based on a judgment of whether or not maintenance of water supply is satisfactory. The following reason underlies this way of judgment: in a case when there is a problem in water discharge, satisfactory water supply is hindered, and thus this enables judgments of appropriateness of water discharge on the basis of whether or not the maintenance of water supply is satisfactory.

TABLE 1

| Conditions | | Results |
|---|---|---|
| Whether or not the lower surface guide is provided | Distance between the lower surface guide and the steel sheet h (mm) | Whether or not maintenance of water supply is satisfactory |
| Yes | 10 | Satisfactory |
| Yes | 20 | Satisfactory |
| No | — | Satisfactory |

As seen from Table 1, by using the above described lower surface guide, it was possible to supply approximately the same amount of cooling water as that in a case of not using the lower surface guide, which corresponds to the case of the highest water discharging ability. Therefore, the above described lower surface guide was found to have a high water discharging ability.

Figure 14:
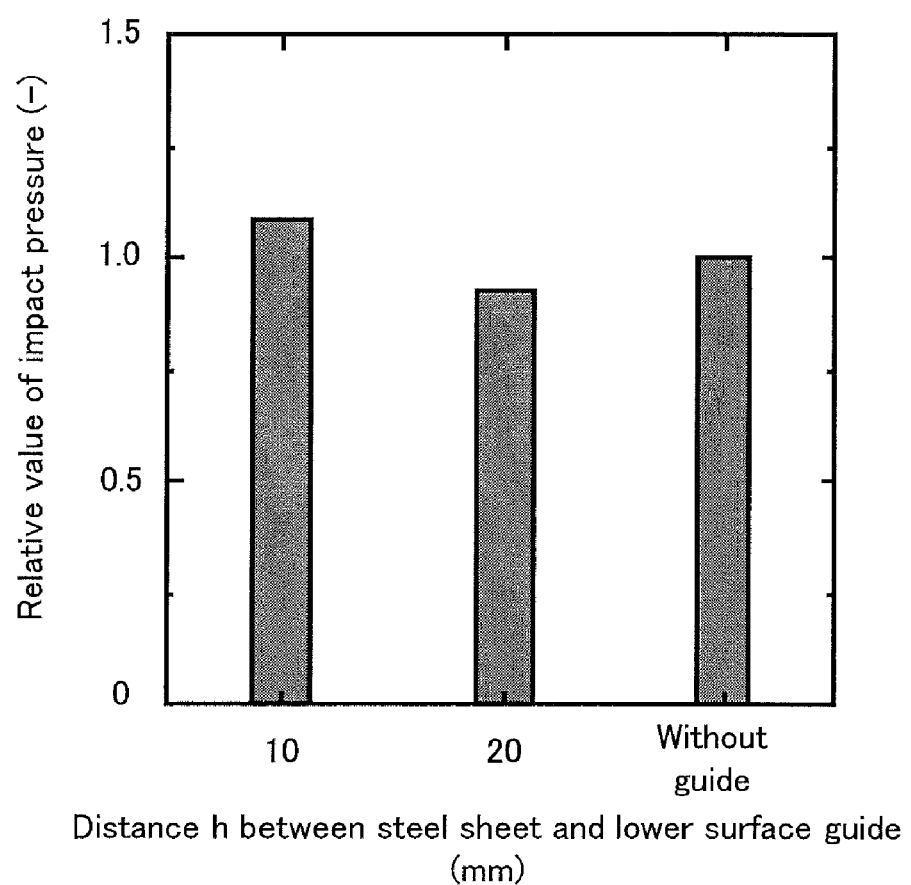
FIG. 14 is a view showing an impact pressure of a jet of water according to a result of the example.

Further, FIG. 14 shows the results comparing an impact pressure of jets of water striking against the steel sheet. In FIG. 14, a case is set to be 1.0 in which the lower surface guide is not provided, which corresponds to the case of the highest water discharging ability; and the relative value is shown. By this, it is understood that even when the lower surface guide is provided, approximately the same impact pressure was obtained as the impact pressure in a case of not providing the above made lower surface guide. Therefore, it was found that the lower surface guide is capable of supplying a jet of water to the steel sheet without attenuating the jet.

The invention has been described above as to the embodiment which is supposed to be practical as well as preferable at present. However, it should be understood that the invention is not limited to the embodiment disclosed in the specification and can be appropriately modified within the range that does not depart from the gist or spirit of the invention, which can be read from the appended claims and the overall specification, and a cooling apparatus of a steel sheet, and a manufacturing apparatus and manufacturing method of a hot-rolled steel sheet with such modifications are also encompassed within the technical range of the invention.

The invention claimed is:

1. A cooling apparatus of a steel sheet which is disposed on a lower process side of a final stand in a row of hot finish rolling mills and which comprises a plurality of cooling nozzles arranged in a manner capable of cooling a steel sheet being transported on transporting rolls,
   wherein the cooling nozzles are arranged on an upper surface side and a lower surface side of an area in which the steel sheet passes, so as to spray cooling water over the area;
   the cooling apparatus is provided with at least one of an upper surface guide arranged on the upper surface side and a lower surface guide arranged on the lower surface side;
   the upper surface guide and the lower surface guide respectively comprise: inlet holes through which the cooling water sprayed from the cooling nozzles passes; and outlet holes through which the cooling water passes to be discharged;
   only the inlet holes or the outlet holes are arranged in a width direction of the steel sheet, forming rows of inlet holes and rows of outlet holes, respectively;
   the row of outlet holes is arranged between the rows of inlet holes in a transporting direction of the steel sheet; and
   the row of outlet holes is provided with devices for preventing entering of a steel sheet, which are members to prevent the steel sheet from entering the row of outlet holes.

2. The cooling apparatus of a steel sheet according to claim 1, wherein each one of the cooling nozzles is provided with each one of the inlet holes.

3. The cooling apparatus of a steel sheet according to claim 1, wherein the lower surface guide comprises members forming a water supplying and discharging passage, which form a water passage leading to the inlet holes and a water passage leading from the outlet holes; and
   cooling water from the cooling nozzles is sprayed into the water passage leading to the inlet holes.

4. The cooling apparatus of a steel sheet according to claim 3, wherein a cross section of a flow path in a lower portion of the passage which leads from the outlet holes of the lower surface guide is formed more widely than a cross-sectional area of a flow path in an upper portion of the passage.

5. The cooling apparatus of a steel sheet according to claim 1, wherein a shape of an opening of the inlet holes is substantially similar to a shape of a jet of cooling water sprayed from the cooling nozzles.

6. The cooling apparatus of a steel sheet according to claim 1, wherein the cooling nozzles are flat spray nozzles.

7. The cooling apparatus of a steel sheet according to claim 1, wherein, among the inlet holes and the outlet holes of the lower surface guide, at least one end of the lower surface guide in a transporting direction of the steel sheet has the outlet holes.

8. The cooling apparatus of a steel sheet according to claim 1, wherein, among the inlet holes and the outlet holes of the lower surface guide, both ends of the lower surface guide in the transporting direction of the steel sheet have the outlet holes.

9. The cooling apparatus of a steel sheet according to claim 1, wherein the outlet holes of the upper surface guide are provided with backflow preventing members standing from edges of the outlet holes.

10. The cooling apparatus of a steel sheet according to claim 1, wherein the upper surface guide comprises, on an upper side of the outlet holes, portions forming a water discharging passage which are surrounded with members to form a passage for water discharge; and
    rectifying members, which are in a protruding shape, are disposed on a part of the portion forming a water discharging passage, the part being opposite to the outlet holes.

11. A manufacturing apparatus of a hot-rolled steel sheet comprising: a final stand in a row of hot finish rolling mills; and the cooling apparatus of a steel sheet according to claim 1, in the mentioned order in the transporting direction of the steel sheet.

12. A manufacturing apparatus of a hot-rolled steel sheet comprising: a final stand in a row of hot finish rolling mills; the cooling apparatus of a steel sheet according to claim 1; and a water removing device which removes the cooling water, in the mentioned order in the transporting direction of the steel sheet.

13. The manufacturing apparatus of a hot-rolled steel sheet according to claim 11, wherein, among the cooling nozzles provided to the cooling apparatus, the cooling nozzle arranged on the most upper process side is disposed inside a housing of the final stand.

14. The manufacturing apparatus of a hot-rolled steel sheet according to claim 11, wherein, among the cooling nozzles provided to the cooling apparatus, at least a cooling water ejection outlet of the cooling nozzle closest to the final stand is directed toward a steel sheet to be positioned at an exit of work rolls in the final stand.

15. The manufacturing apparatus of a hot-rolled steel sheet according to claim 11, comprising equipment which is disposed in a manner contacting with the steel sheet or in a manner close to the steel sheet, and which is arranged to be orthogonal to the transporting direction of the steel sheet, wherein among the inlet holes and the outlet holes of the lower surface guide, the outlet holes are arranged most closely to the equipment.

16. The manufacturing apparatus of a hot-rolled steel sheet according to claim 15, wherein the equipment is the work roll in the final stand.

17. A manufacturing method of a hot-rolled steel sheet comprising a step to treat a steel sheet rolled in the final stand by using the manufacturing apparatus of a hot-rolled steel sheet according to claim 11.

* * * * *